(12) United States Patent
Michikawauchi et al.

(10) Patent No.: US 12,441,163 B2
(45) Date of Patent: Oct. 14, 2025

(54) IN-VEHICLE TEMPERATURE CONTROL SYSTEM

(71) Applicants: TOYOTA JIDOSHA KABUSHIKI KAISHA, Toyota (JP); DENSO CORPORATION, Kariya (JP)

(72) Inventors: Ryo Michikawauchi, Numazu (JP); Hidefumi Aikawa, Sunto-gun (JP); Masanari Numata, Kariya (JP); Yu Ofune, Kariya (JP); Satoshi Ito, Kariya (JP); Naoki Kato, Kariya (JP); Tatsuhito Matsumoto, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 107 days.

(21) Appl. No.: 18/407,988

(22) Filed: Jan. 9, 2024

(65) Prior Publication Data

US 2024/0239157 A1    Jul. 18, 2024

(30) Foreign Application Priority Data

Jan. 16, 2023   (JP) ................................. 2023-004527

(51) Int. Cl.
*B60H 1/32*   (2006.01)
*B60H 1/00*   (2006.01)

(52) U.S. Cl.
CPC ....... *B60H 1/3228* (2019.05); *B60H 1/00899* (2013.01)

(58) Field of Classification Search
CPC .............. B60H 1/3228; B60H 1/00899; B60H 1/00485; B60H 1/00885; B60H 1/00921;
(Continued)

(56) References Cited

U.S. PATENT DOCUMENTS

2021/0094390 A1 *  4/2021  Aikawa ................ B60H 1/3227
2022/0009309 A1    1/2022  Miura et al.

FOREIGN PATENT DOCUMENTS

CN       115366620 A  * 11/2022   ............. F01P 7/165
JP     2015186989 A  * 10/2015   ................ F25B 7/00
(Continued)

*Primary Examiner* — Emmanuel E Duke
(74) *Attorney, Agent, or Firm* — Oblon, McClelland, Maier &Neustadt, L.L.P.

(57) ABSTRACT

A system includes: a low-temperature circuit having a chiller and in which a cooling water circulates therethrough; a heat dissipation unit for dissipating heat to an air; a refrigeration circuit in which a refrigerant circulates and for absorbing heat from the cooling water to the refrigerant at the chiller and dissipating heat from the refrigerant at the heat dissipation unit; a ratio adjusting device for adjusting a heat dissipation unit passing ratio; and a controller for controlling an heat transfer amount adjusting apparatus capable of adjusting the heat transfer amount in the refrigeration circuit and the ratio adjusting device. If it is predicted that the temperature of the cooling water decreases, the controller controls the apparatus so that the heat transfer amount is increased and controls the ratio adjusting device so that the ratio is decreased, before the temperature of the cooling water flowing through the chiller decreases.

8 Claims, 13 Drawing Sheets

(58) Field of Classification Search
CPC ............ B60H 1/32284; B60H 1/00642; B60H 1/00007; B60H 1/00328; B60H 1/00385; B60H 1/00735; B60H 1/00835; B60H 2001/00307
See application file for complete search history.

(56) References Cited

FOREIGN PATENT DOCUMENTS

| | | | | | |
|---|---|---|---|---|---|
| JP | 2019034587 | A | * | 3/2019 | ............. F25B 29/00 |
| JP | 2020-165604 | A | | 10/2020 | |
| JP | 2021054278 | A | * | 4/2021 | ......... H05K 7/20927 |
| JP | 2022178219 | A | * | 12/2022 | ......... B60H 1/32284 |
| WO | WO-2018158837 | A1 | * | 9/2018 | ........... G05D 23/303 |

* cited by examiner

IN-VEHICLE TEMPERATURE CONTROL SYSTEM

FIELD

The present disclosure relates to an in-vehicle temperature control system.

BACKGROUND

Conventionally, there has been known an in-vehicle temperature control system that includes a low-temperature-side thermal circuit in which a low-temperature-side heat medium circulates, a refrigeration circuit in which a refrigerant circulates, and a high-temperature-side thermal circuit in which a high-temperature-side heat medium circulates (JP 2020-165604 A). In the in-vehicle temperature control system described in JP 2020-165604 A, heat absorption from the heat medium to the refrigerant is performed by a chiller, and heat used for heating an interior of the vehicle is dissipated from a condenser.

In particular, it is disclosed in JP 2020-165604 A that the flow rate of the refrigerant through the chiller is temporarily reduced to prevent deterioration of the durability of the compressor, when a state is changed from a state where the cooling of the battery provided in the low-temperature-side thermal circuit is demanded to a state where it is not demanded, or when a stated is changed from the state where it is not demanded to the state where it is demanded. In addition, in JP 2020-165604 A, the high-temperature-side heating medium is heated by an electric heater since the temperature of the air blown into the interior of the vehicle is reduced in the heating mode by decreasing the flow rate of the refrigerant passing through the chiller.

SUMMARY

In the control described in JP 2020-165604 A, the high-temperature-side heating medium is heated by the electric heater in order to suppress a decrease in the temperature of the blown air in the heating mode. Therefore, when the electric heater is not provided, there is a possibility that the temperature of the blown air in the heating mode is decreased.

In view of the above problems, an object of the present disclosure is to suppress a change in the temperature of the air flowing into the interior of the vehicle even if the temperature of the low-temperature-side heat medium in the low-temperature-side thermal circuit changes.

The gist of the present disclosure is as follows.

(1) An in-vehicle temperature control system mounted on a vehicle, comprising:
  a low-temperature circuit having a first heat exchanger and in which a first heat medium circulates through the first heat exchanger;
  a heat dissipation unit for dissipating heat to an air flowing into an interior of the vehicle;
  a refrigeration circuit in which a refrigerant circulates and for absorbing heat from the first heat medium to the refrigerant at the first heat exchanger and dissipating heat from the refrigerant at the heat dissipation unit;
  a ratio adjusting device for adjusting a heat dissipation unit passing ratio which is a ratio of a flow rate of air passing through the heat dissipation unit among air flowing into the interior of the vehicle; and
  a controller for controlling an apparatus capable of adjusting a heat transfer amount which is absorbed to the refrigerant at the first heat exchanger in the refrigeration circuit and is dissipated from the refrigerant at the heat dissipation unit, and the ratio adjusting device, wherein
  if it is predicted that the temperature of the first heat medium flowing through the first heat exchanger decreases by a reference value or more, the controller controls the apparatus so that the heat transfer amount is increased and controls the ratio adjusting device so that the heat dissipation unit passing ratio is decreased, before the temperature of the first heat medium flowing through the first heat exchanger decreases by the reference value or more.

(2) The in-vehicle temperature control system according to above (1), wherein, if it is predicted that the temperature of the first heat medium flowing through the first heat exchanger decreases by the reference value or more, the controller controls the apparatus so that the heat transfer amount increases as the predicted value of the amount of decrease in the temperature of the first heat medium increases.

(3) The in-vehicle temperature control system according to above (1) or (2), wherein the controller controls the heat dissipation unit passing ratio of the ratio adjusting device so that a temperature of the air flowing into the interior of the vehicle becomes a target temperature, based on a temperature of the heat dissipation unit.

(4) The in-vehicle temperature control system according to any one of above (1) to (3), wherein
  the low-temperature circuit has a plurality of parallel flow paths through which the first heat medium flows,
  the in-vehicle temperature control system further comprises:
  a first temperature detector for detecting the temperature of the first heat medium flowing through the first heat exchanger; and
  a second temperature detector for detecting the temperature of the first heat medium in a flow path through which the first heat medium does not circulate before the flow path is switched and through which the first medium circulates after the flow path is switched, among the low-temperature circuit, and
  the controller predicts whether or not the temperature of the first heat medium flowing through the first heat exchanger changes by the reference value or more by switching the flow path, based on the temperature detected by the first temperature detector and the temperature detected by the second temperature detector.

(5) The in-vehicle temperature control system according to any one of above (1) to (4), wherein
  the heat dissipation unit is a high-temperature circuit having a heater core for dissipating heat to the air flowing into the interior of the vehicle and a second heat exchanger, and in which a second heat medium circulates through them, and
  the second heat exchanger dissipates heat from the refrigerant to the second heat medium.

(6) The in-vehicle temperature control system according to any one of above (1) to (4), wherein the heat dissipation unit is an air-cooled condenser that directly dissipates heat from the refrigerant to the air flowing into the interior of the vehicle.

(7) The in-vehicle temperature control system according to any one of above (1) to (6), wherein the apparatus includes a compressor provided in the refrigeration circuit and configured to compress the refrigerant.

(8) The in-vehicle temperature control system according to any one of above (1) to (7), wherein the apparatus includes an expansion valve provided in the refrigeration circuit and configured to expand the refrigerant.

DESCRIPTION OF EMBODIMENTS

Figure 1:
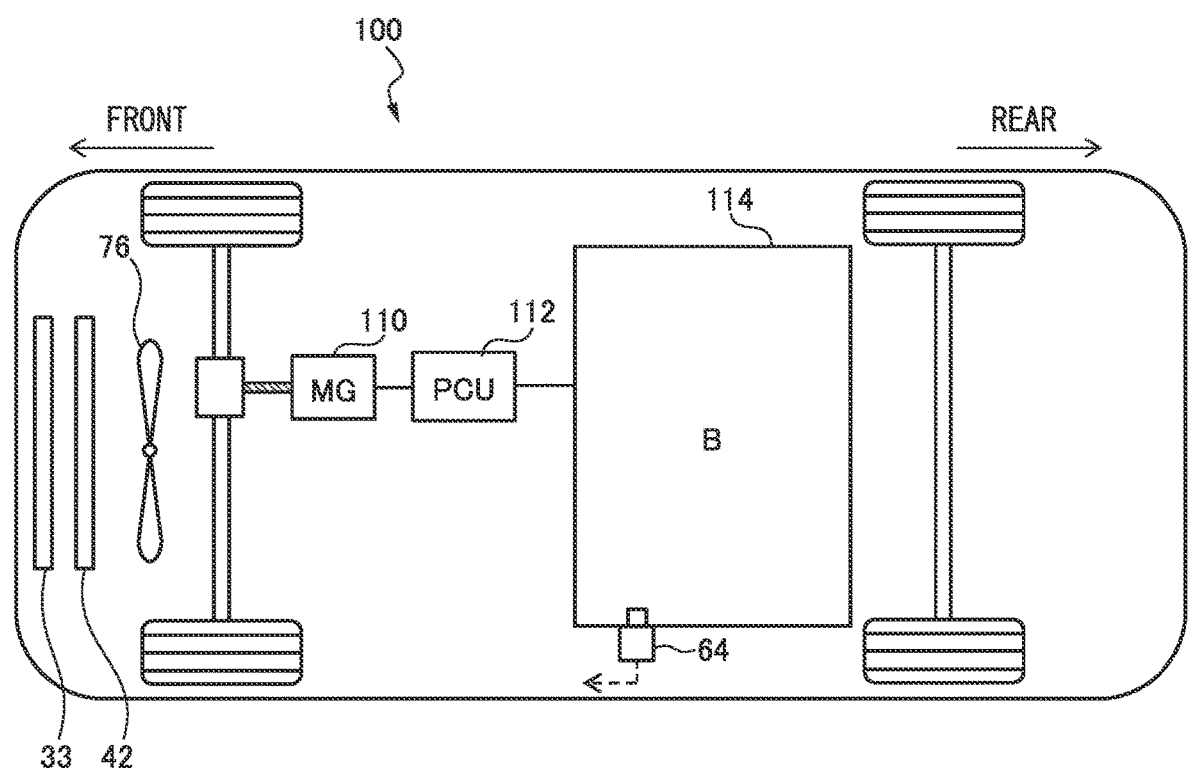
FIG. 1 is a diagram schematically illustrating a configuration of a vehicle equipped with an in-vehicle temperature control system according to one embodiment.

Hereinafter, embodiments will be described in detail with reference to the drawings. In the following description, the same reference numerals are given to the same elements.

First Embodiment

<Configuration of Vehicle>

FIG. 1 is a diagram schematically illustrating a configuration of a vehicle 100 equipped with an in-vehicle temperature control system 1 according to a first embodiment. In FIG. 1, the left side indicates a front side of the vehicle 100, and the right side indicates a rear side of the vehicle 100. As shown in FIG. 1, the vehicle 100 is an electric vehicle (BEV), and includes a motor generator (MG) 110 for driving the vehicle, and a power control unit (PCU) 112 electrically connected to the MG 110, and a battery 114 electrically connected to the PCU 112.

The MG 110 functions as an electric motor and a generator. The MG 110 is used to drive the vehicle 100 or to regenerate when braking the vehicle 100. In the present embodiment, the MG 110 that functions also as a generator is used as a motor for driving the vehicles 100, but a motor that does not function as a generator but functions only as an electric motor may be used.

The PCU 112 is connected between the battery 114 and the MG 110 to control the power supplied to the MG 110. The PCU 112 includes heat generating components such as an inverter that drives a motor, a step-up converter that controls a voltage, and a DC/DC converter that steps down a high voltage. The battery 114 is connected to the PCU 112 and supplies power for driving the vehicles 100 to the MG 110.

The vehicle 100 may be a hybrid vehicle (HEV) including an internal combustion engine in addition to an electric motor for driving the vehicle 100. Further, for example, the vehicle 100 may be configured to have two MGs: one MG mainly used for driving the vehicle 100, and the other MG mainly used for power generation.

<Configuration of In-Vehicle Temperature Control System>

Figure 2:
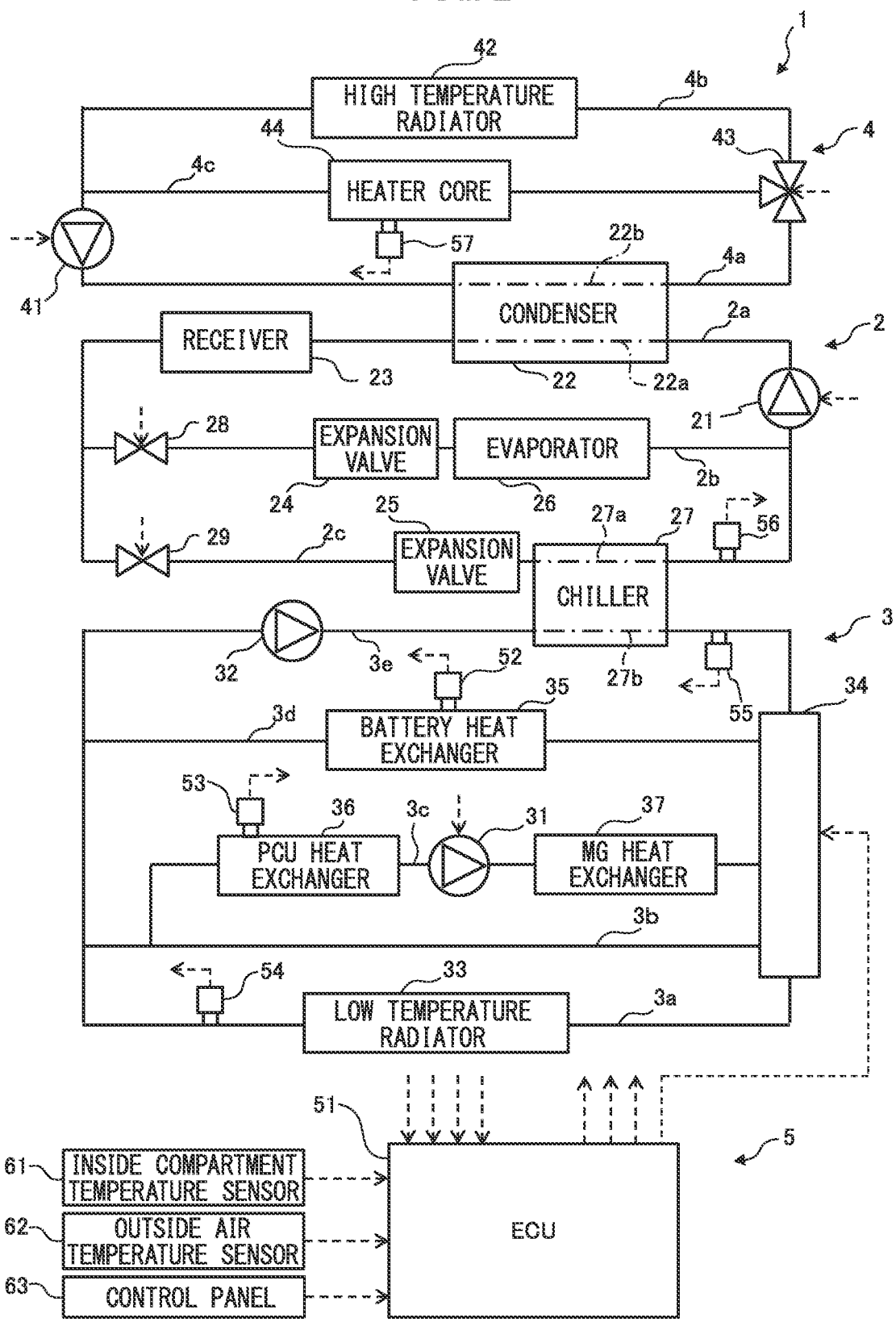
FIG. 2 is a configuration diagram schematically illustrating the in-vehicle temperature control system.
Figure 3:
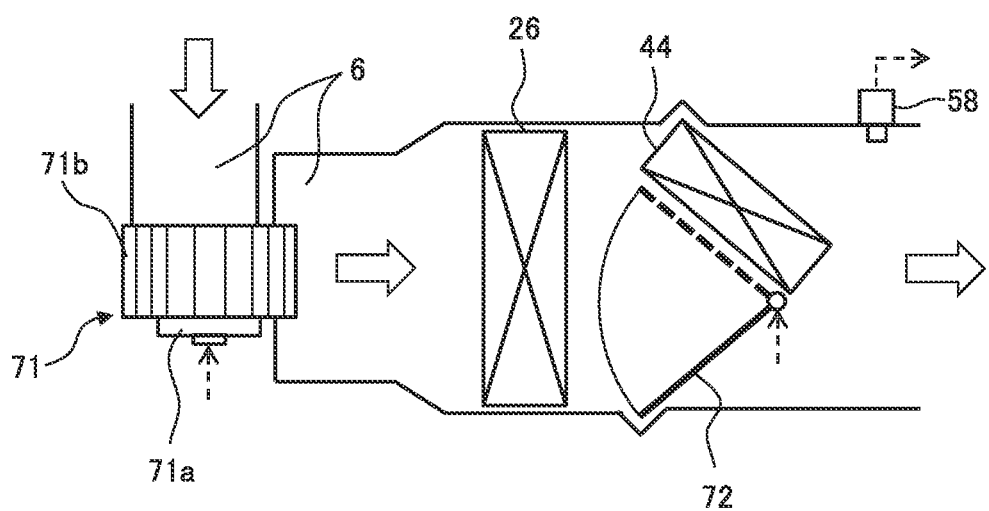
FIG. 3 is a configuration diagram schematically illustrating an air passage for air conditioning of the vehicle equipped with the in-vehicle temperature control system.

Referring to FIGS. 1 to 3, a configuration of an in-vehicle temperature control system 1 according to an embodiment will be described. FIG. 2 is a configuration diagram schematically showing the in-vehicle temperature control system 1. The in-vehicle temperature control system 1 provided with a vehicle includes a refrigeration circuit 2, a low-temperature circuit 3, a high-temperature circuit 4, and a control device 5. The refrigeration circuit 2, the low-temperature circuit 3, and the high-temperature circuit 4 function as a thermal circuit that transfers heat from or to the outside of the circuit.

<<Refrigeration Circuit>>

First, the refrigeration circuit 2 will be described. The refrigeration circuit 2 includes a compressor 21, a refrigerant pipe 22a of a condenser 22, a receiver 23, a first expansion valve 24, a second expansion valve 25, an evaporator 26, a refrigerant pipe 27a of a chiller 27, a first electromagnetic regulation valve 28, and a second electromagnetic regulation valve 29. The refrigeration circuit 2 is configured to realize a refrigeration cycle by circulating refrigerant through these components when the compressor 21 is driven. As the refrigerant, for example, a hydrofluorocarbon (e.g., HFC-134a) or any other material generally used as a refrigerant in a refrigeration cycle is used.

Further, the refrigeration circuit 2 includes a refrigeration basic flow path 2a, an evaporator flow path 2b, and a chiller flow path 2c. The evaporator flow path 2b and the chiller flow path 2c are provided in parallel to each other, and are connected to the refrigeration basic flow path 2a.

In the refrigeration basic flow path 2a, the compressor 21, the refrigerant pipe 22a of the condenser 22, and the receiver 23 are provided in this order in the circulation direction of the refrigerant. In the evaporator flow path 2b, the first electromagnetic regulation valve 28, the first expansion valve 24, and the evaporator 26 are provided in this order in the circulation direction of the refrigerant. On the other hand, in the chiller flow path 2c, the second electromagnetic regulation valve 29, the second expansion valve 25, and the refrigerant pipe 27a of the chiller 27 are provided in this order.

The compressor 21 functions as a compressor that compresses a refrigerant. In the present embodiment, the compressor 21 is of an electric type, and is configured such that the discharge capacity thereof can be changed steplessly by adjusting the power supplied to the compressor 21. Therefore, the compressor 21 can change the flow rate of the refrigerant in the refrigeration circuit 2. In the compressor 21, the low-temperature, low-pressure and mainly gaseous refrigerant flowing out from the evaporator 26 or the chiller 27 is adiabatically compressed, thereby being changed to a high-temperature, high-pressure and mainly gaseous refrigerant. In particular, in the compressor 21, if the discharge flow rate thereof changes, the heat absorption amount at the evaporator 26 or the chiller 27 and the heat dissipation amount at the condenser 22 change. Therefore, the compressor 21 is an example of a device which can adjust a heat absorbed to the refrigerant at the chiller 27 and dissipated from the refrigerant to the cooling water in the high-temperature circuit 4 at the condenser 11 (hereinafter, simply referred to as "heat transfer amount"), in the refrigeration circuit 2 (hereinafter, referred to as "heat transfer amount adjusting device").

The condenser 22 has a refrigerant pipe 22a and a cooling water pipe 22b. The condenser 22 functions as a heat exchanger (second heat exchanger) that dissipates heat from the refrigerant to the cooling water flowing through the cooling water pipe 22b of the high-temperature circuit 4 described later to condense the refrigerant. Therefore, the refrigerant pipe 22a of the condenser 22 functions as a condenser that condenses the refrigerant in the refrigeration cycle. Further, in the refrigerant pipe 22a of the condenser 22, the high-temperature, high-pressure and mainly gaseous refrigerant that has flowed out from the compressor 21 is cooled in an isobaric manner, thereby being changed to the high-temperature, high-pressure and mainly liquid refrigerant.

The receiver 23 stores the refrigerant condensed by the refrigerant pipe 22a of the condenser 22. In addition, since the condenser 22 cannot necessarily liquefy all of the refrigerant, the receiver 23 is configured to separate the gas and liquid. Only the liquid refrigerant in which the gaseous refrigerant is separated flows out from the receiver 23.

The first expansion valve 24 and the second expansion valve 25 function as an expander for expanding the refrigerant. The expansion valves 24 and 25 include, for example, thin passages, and rapidly reduce the pressure of the refrigerant by spraying the refrigerant from the thin passages. In particular, the expansion valves 24 and 25 are configured such that the lower the opening degree thereof, the lower the pressure of the refrigerant. Therefore, the expansion valves 24 and 25 can change the degree of superheat of the refrigerant flowing into the evaporator 26 or the chiller 27. The first expansion valve 24 sprays the liquid refrigerant supplied from the receiver 23 into the evaporator 26 in a mist form. Similarly, the second expansion valve 25 sprays the liquid refrigerant supplied from the receiver 23 into the refrigerant pipe 27a of the chiller 27 in a mist form. In the expansion valves 24 and 25, the high-temperature, high-pressure and liquid refrigerant flowing out from the receiver 23 is changed to a low-temperature, low-pressure and atomized refrigerant by being depressurized and partially vaporized. In particular, at the expansion valves 24 and 25, if the opening degree thereof changes, the heat absorption amount at the evaporator 26 or the chiller 27 changes and according to this change the heat dissipation amount at the condenser 22 changes. Therefore, the expansion valves 24 and 25 are examples of the heat transfer amount adjusting device.

The evaporator 26 functions as an evaporator that makes the refrigerant absorb heat and evaporates the refrigerant. Specifically, the evaporator 26 absorbs heat from the air around the evaporator 26 to the refrigerant, and evaporates the refrigerant. Therefore, in the evaporator 26, the low-temperature, low-pressure and atomized refrigerant flowing out from the first expansion valve 24 is changed to the low-temperature, low-pressure and gaseous refrigerant by evaporation. As a result, the air around the evaporator 26 is cooled, and the interior of the vehicle 100 can be cooled.

The chiller 27 includes a refrigerant pipe 27a and a cooling water pipe 27b. The chiller 27 functions as a heat exchanger (first heat exchanger) that absorbs heat from the cooling water flowing through the cooling water pipe 27b of the low-temperature circuit 3, which will be described later, to the refrigerant and evaporates the refrigerant. The refrigerant pipe 27a of the chiller 27 functions as an evaporator for evaporating the refrigerant. Further, in the refrigerant pipe 27a of the chiller 27, the low-temperature, low-pressure and atomized refrigerant flowing out from the second expansion valve 25 is changed to the low-temperature, low-pressure and gaseous refrigerant by evaporating. As a result, the cooling water of the low-temperature circuit 3 is cooled.

The first electromagnetic regulation valve 28 and the second electromagnetic regulation valve 29 are used to change the flow mode of the refrigerant in the refrigeration circuit 2. As the opening degree of the first electromagnetic regulation valve 28 increases, the flow rate of refrigerant flowing into the evaporator flow path 2b increases, and thus the flow rate of refrigerant flowing into the evaporator 26 increases. Further, as the opening degree of the second electromagnetic regulation valve 29 increases, the flow rate of refrigerant flowing into the chiller flow path 2c increases, and thus the flow rate of refrigerant flowing into the chiller 27 increases. As long as the flow rate flowing from the refrigeration basic flow path 2a into the evaporator flow path 2b and the chiller flow path 2c can be adjusted, any valve may be provided instead of the electromagnetic regulation valves 28 and 29.

<<Low-Temperature Circuit>>

Next, the low-temperature circuit 3 will be described. The low-temperature circuit 3 includes a first pump 31, a second pump 32, a cooling water pipe 27b of the chiller 27, a low-temperature radiator 33, and a five-way valve 34. In addition, the low-temperature circuit 3 includes a battery heat exchanger 35, a PCU heat exchanger 36 and a MG heat exchanger 37. In the low-temperature circuit 3, cooling water circulates through these components. The cooling water flowing in the low-temperature circuit 3 is an example of the first heat medium, and any other heat medium may be used in the low-temperature circuit 3 instead of the cooling water.

The low-temperature circuit 3 includes a low-temperature radiator flow path 3a, a circulation flow path 3b, a heat generating device flow path 3c, a battery flow path 3d, and a chiller flow path 3e. One ends of the low-temperature radiator flow path 3a, the circulation flow path 3b, the heat generating device flow path 3c, the battery flow path 3d, and the chiller flow path 3e is connected to the five-way valve 34 so as to be parallel to each other. The other ends of the low-temperature radiator flow path 3a, the circulation flow path 3b, the battery flow path 3d, and the chiller flow path 3e are connected to each other. The other end of the heat generating device flow path 3c is connected to the circulation flow path 3b.

A low-temperature radiator 33 is provided in the low-temperature radiator flow path 3a. The PCU heat exchanger 36, the first pump 31, and the MG heat exchanger 37 are provided in this order in the circulation direction of the cooling water in the heat generating device flow path 3c. The heat generating device flow path 3c may be provided with a heat exchanger that exchanges heat with a heat generating device other than the PCU 112 and the MG 110. The battery heat-exchanger 35 is provided in the battery flow path 3d. In the chiller flow path 3e, the second pump 32 and the cooling water pipe 27b of the chiller 27 are provided in this order in the circulation direction of the cooling water.

The first pump 31 and the second pump 32 pump the cooling water circulating in the low-temperature circuit 3. Therefore, the first pump 31 and the second pump 32 can change the flow rate of the cooling water flowing in the low-temperature circuit 3. In the present embodiment, the first pump 31 and the second pump 32 are electric water pumps, and are configured such that the discharge capacity thereof is changed steplessly by adjusting the supply power or the duty ratio to the first pump 31 and the second pump 32.

The low-temperature radiator 33 is a heat exchanger that exchanges heat between the cooling water circulating in the low-temperature circuit 3 and the air (outside air) outside the vehicle 100, and is therefore an example of an external heat exchanger that radiates heat from the cooling water to the outside or absorbs heat from the outside to the cooling water. The low-temperature radiator 33 is configured to radiate heat from the cooling water to the outside air when the temperature of the cooling water is higher than the temperature of the outside air, and to absorb heat from the outside air to the cooling water when the temperature of the cooling water is lower than the temperature of the outside air.

The five-way valve 34 controls the flow mode of the cooling water circulating in the low-temperature circuit 3. The five-way valve 34 is connected to the low-temperature radiator flow path 3a, the circulation flow path 3b, the heat generating device flow path 3c, the battery flow path 3d, and the chiller flow path 3e. Then, the five-way valve 34 connects these flow paths by any combination. In the present embodiment, the five-way valve 34 is configured to be capable of setting a plurality of connection states including the first state to the third state. The first state is a connection state in which the circulation flow path 3b and the heat generating device flow path 3c are connected to each other, the battery flow path 3d and the chiller flow path 3e are connected to each other, and the other flow paths are not connected to each other. The second state is a connection state in which the low-temperature radiator flow path 3a and the chiller flow path 3e are connected to each other, the circulation flow path 3b and the heat generating device flow path 3c are connected to each other, and the other flow paths are not connected to each other. The third state is a connection state in which the low-temperature radiator flow path 3a and the heat generating device flow path 3c are connected to each other, the battery flow path 3d and the chiller flow path 3e are connected to each other, and the other flow paths are not connected to each other. Although the five-way valve 34 is used in the present embodiment, as long as it is possible to set the connection state of the low-temperature circuit 3 to the first state to the third state, a flow mode control device other than the five-way valve, such as two three-way valves, may be provided.

The battery heat exchanger 35 is an example of an external heat exchanger that absorbs heat from the outside to the cooling water. In particular, the battery heat exchanger 35 is configured to exchange heat between the battery 114 of the vehicle 100, which is a heat generating device (external heat source), and the cooling water. Specifically, the battery heat exchanger 35 includes, for example, a pipe provided around the battery 114, and heat exchange is performed between the cooling water flowing through the pipe and the battery 114.

Further, the PCU heat exchanger 36 is an example of an external heat exchanger that absorbs heat from the outside to the cooling water. In particular, the PCU heat exchanger 36 is configured to exchange heat between the PCU 112 of the vehicle 100, which is heat generating devices (external heat sources), and the cooling water. Specifically, the PCU heat exchanger 36 includes a pipe provided around the PCU 112, and is configured such that heat is exchanged between the cooling water flowing through the pipe and the PCU 112.

The MG heat exchanger 37 is an example of an external heat exchanger that absorbs heat from the outside to the cooling water, and is an example of a heat absorption amount change device related to the low-temperature circuit 3. In particular, the MG heat exchanger 37 functions as a heat exchanger for a heat generating device that exchanges heat between the MG 110 (or motor) of the vehicle 100, which is a heat generating device (external heat source), and the cooling water. Specifically, the MG heat exchanger 37 includes pipes provided around the MG 110 and around the cooling water, oil flowing in these pipes (third heat medium), and an oil pump that circulates the oil in these pipes. In the MG heat exchanger 37, the oil pump is driven and oil flows in the pipe, so that heat is exchanged between the MG 110 and the cooling water. Therefore, the oil pump is configured to heat-exchange between the MG 110 and the cooling water of the low-temperature circuit 3 via the oil. As a result, the oil pump can change the heat absorption amount in the MG heat exchanger 37.

<<High-Temperature Circuit>>

Next, the high-temperature circuit 4 will be described. The high-temperature circuit 4 includes a third pump 41, a cooling water pipe 22b of the condenser 22, a high-temperature radiator 42, a three-way valve 43, and a heater core 44. The high-temperature circuit 4 also circulates cooling water through these components. Note that this cooling water is an example of the second heating medium, and any other heating medium may be used in the high-temperature circuit 4 instead of the cooling water.

The high-temperature circuit 4 also includes a high-temperature basic flow path 4a, a high-temperature radiator flow path 4b, and a heater flow path 4c. The high-temperature radiator flow path 4b and the heater flow path 4c are connected to the high-temperature basic flow path 4a in parallel with each other.

In the high-temperature basic flow path 4a, the third pump 41 and the cooling water pipe 22b of the condenser 22 are provided in this order in the circulation direction of the cooling water. The high-temperature radiator 42 is provided in the high-temperature radiator flow path 4b, and a heater core 44 is provided in the heater flow path 4c. The three-way valve 43 is provided between the high-temperature basic flow path 4a, the high-temperature radiator flow path 4b, and the heater flow path 4c.

The third pump 41 pumps the cooling water circulating in the high-temperature circuit 4. In the present embodiment, the third pump 41 is an electric water pump similar to the first pump 31 and the second pump 32. The high-temperature radiator 42 is, similarly to the low-temperature radiator 33, a heat exchanger that exchanges heat between the cooling water circulating in the high-temperature circuit 4 and the outside air.

The three-way valve 43 controls a flow mode of the cooling water flowing out from the cooling water pipe 22b of the condenser 22. The three-way valve 43 is configured so that a flow destination can be selectively changed between the high-temperature radiator flow path 4b and the heater flow path 4c. When the three-way valve 43 is set to a side of the high-temperature radiator flow path 4b, the cooling water flowing out from the cooling water pipe 22b of the condenser 22 flows through the high-temperature radiator flow path 4b. On the other hand, when the three-way valve 43 is set to a side of the heater flow path 4c, the cooling water flowing out from the cooling water pipe 22b of the condenser 22 flows through the heater core 44. Note that, as long as the flow rate of the cooling water flowing into the high-temperature radiator flow path 4b and the heater flow path 4c can be appropriately adjusted, other flow mode control devices such as a regulating valve and an on-off valve may be used instead of the three-way valve 43.

The heater core 44 is configured to perform heat exchange between the cooling water circulating in the high-temperature circuit 4 and the air around the heater core 44 (the air flowing into the interior of the vehicle 100) to perform heating of the interior of the vehicle 100. Specifically, the heater core 44 is configured to dissipate heat from the cooling water to the air around the heater core 44. Therefore, when the high-temperature cooling water flows through the heater core 44, the temperature of the cooling water decreases and the air around the heater core 44 is warmed.

In the high-temperature circuit 4 configured as above, heat is dissipated from the refrigerant at the condenser 22, and is dissipated at the heater core 44 to the air flowing into the interior of the vehicle 100. Therefore, the high-temperature circuit 4 is an example of the heat dissipation unit for dissipating heat to the air flowing into the interior of the vehicle 100.

Note that the high-temperature circuit 4 according to the present embodiment is not provided with an electric heater that heats the cooling water in the high-temperature circuit 4. Therefore, the cooling water in the high-temperature circuit 4 is basically heated by the heat transferred from the refrigerant at the condenser 22.

The low-temperature radiator 33 and the high-temperature radiator 42 are disposed inside the front grille of the vehicle 100, as shown in FIG. 1. Therefore, when the vehicle 100 is traveling, the radiators 33 and 42 are hit by the traveling wind. Further, a fan 76 is provided adjacent to the radiators 33 and 42. When driven, the fan 76 is configured to hit the radiators 33, 42 with wind. Therefore, even when the vehicle 100 is not traveling, the radiators 33 and 42 can be hit with wind by driving the fan 76.

<<Air Passage>>

FIG. 3 is a configuration diagram schematically showing the air passage 6 for air conditioning of the vehicle 100 equipped with the in-vehicle temperature conditioning system 1. In the air passage 6, air flows in a direction indicated by arrows in the drawing. The air passage 6 shown in FIG. 3 is connected to an air inlet of the outside or an interior of the vehicle 100, and the outside air or the interior air flows into the air passage 6 in accordance with a control state by the control device 5. Further, the air passage 6 shown in FIG. 3 is connected to a blowoff port for blowing air into the interior of the vehicle 100, and air is supplied from the air passage 6 to an arbitrary blowoff port in accordance with a control state by the control device 5.

As shown in FIG. 3, in the air passage 6 for air conditioning of the present embodiment, a blower 71, an evaporator 26, an air mix door 72, and a heater core 44 are provided in this order in the air flow direction.

The blower 71 includes a blower motor 71a and a blower fan 71b. The blower 71 is configured such that when the blower fan 71b is driven by the blower motor 71a, the outside air or the interior air flows into the air passage 6, and the air flows through the air passage 6.

The air mix door 72 adjusts the flow rate of the air flowing through the heater core 44 among the air flowing through the air passage 6. The air mix door 72 is configured to be able to adjust between a state in which all air flowing through the air passageway 6 flows through the heater core 44, a state in which all air flowing through the air passageway 6 does not flow through the heater core 44, and a state in between. Therefore, the air mix door 72 is an example of a ratio adjusting device for adjusting a heater passing ratio which is a ratio of the flow rate of the air flowing through the heater core 44 with respect to the air flowing into the interior of the vehicle 100.

In the air passage 6 configured as described above, when the refrigerant is flowing through the evaporator 26 while the blower 71 is being driven, the air flowing through the air passage 6 is cooled. Therefore, the cooling of the interior is performed. Further, when the cooling water flows through the heater core 44 and the air mix door 72 is controlled so that air flows through the heater core 44 while the blower 71 is being driven, the air flowing through the air passage 6 is warmed. Therefore, the heating of the interior is performed.

<<Control Device>>

Referring to FIG. 2, the control device 5 includes an electronic control unit (ECU) 51. The ECU 51 includes a processor that performs various operations, a memory that stores programs and various types of information, and interfaces that are connected to various types of actuators and sensors.

Further, the control device 5 includes a battery water temperature sensor (temperature detector) 52 for detecting the temperature of the cooling water flowing through the battery heat exchanger 35, a PCU water temperature sensor (temperature detector) 53 for detecting the temperature of the cooling water flowing through the PCU heat exchanger 36, a radiator water temperature sensor (temperature detector) 54 for detecting the temperature of the cooling water flowing through the low-temperature radiator 33, and a chiller water temperature sensor 55 (temperature detector) for detecting the temperature of the cooling water flowing through the chiller 27. In addition, the control device 5 includes a temperature and pressure sensor 56 for detecting the temperature and pressure of the refrigerant flowing through the chiller 27, a heater core water temperature sensor 57 for detecting the temperature of the cooling water flowing through the heater core 44, and a blowout temperature sensor 58 (FIG. 3) for detecting the temperature of the air flowing out from the air passage 6 into the interior. The control device 5 further includes an indoor temperature sensor 61 that detects the temperature inside the vehicle 100, an outdoor air temperature sensor 62 that detects the temperature outside the vehicle 100, an operation panel 63 that is operated by a user, and a battery temperature sensor 64 (FIG. 1) that detects the temperature of the battery 114. The ECU 51 is connected to the sensors and the operation panel 63, and output signals from the sensors and the operation panel 63 are input to the ECU 51.

The ECU 51 determines whether or not there is a cooling request and a heating request based on, for example, the output signals from the indoor temperature sensor 61, the outdoor air temperature sensor 62, and the operation panel 63. For example, when the user turns ON the heating switch of the operation panel 63, the ECU 51 determines that heating is required. When the user turns ON the auto-switch of the operation panel 63, for example, the ECU 51 determines that heating is required when the set temperature set by the user via the operation panel 63 is higher than the temperature detected by the indoor temperature sensor 61. In addition, the ECU 51 determines whether or not there is a cooling request of the battery 114, based on the output of the battery temperature sensor 64. For example, when the temperature of the battery 114 is equal to or higher than the cooling reference temperature, the ECU 51 determines that cooling of the battery 114 is required.

The ECU 51 is connected to various actuators of the in-vehicle temperature control system 1 to control these actuators. Specifically, the ECU 51 is connected to and controls the compressor 21, the electromagnetic regulation valves 28 and 29, the pumps 31, 32, and 41, the oil pump of the MG exchanger 37, the five-way valve 34, the three-way valve 43, the blower motor 71a, the air mix door 72, and the fan 76. Therefore, the ECU 51 functions as a control device that controls the devices related to the heat medium (the refrigerant and the cooling water) in the refrigeration circuit 2, the low-temperature circuit 3, and the high-temperature circuit 4.

<Flow Mode of In-Vehicle Temperature Control System>

Next, with reference to FIGS. 4 to 8, a typical flow mode of the heat medium (refrigerant and cooling water) in the in-vehicle temperature control system 1 will be described. In FIG. 4 to FIG. 8, the flow paths through which the refrigerant or the cooling water are flowing is indicated by a solid line, and the flow paths through which the refrigerant or the cooling water are not flowing is indicated by a broken line. Further, the thin arrows in the drawing indicate the direction in which the refrigerant and the cooling water flow, and the thick arrows in the drawing indicate the direction in which the heat moves. In the present embodiment, the cooling requirements for the PCU 112 and the MG 110 are always present, and therefore, the cooling water is constantly circulated through the PCU heat exchanger 36 and the MG heat exchanger 37 regardless of the flow mode of the heat medium.

<<Stop Mode>>

Figure 4:
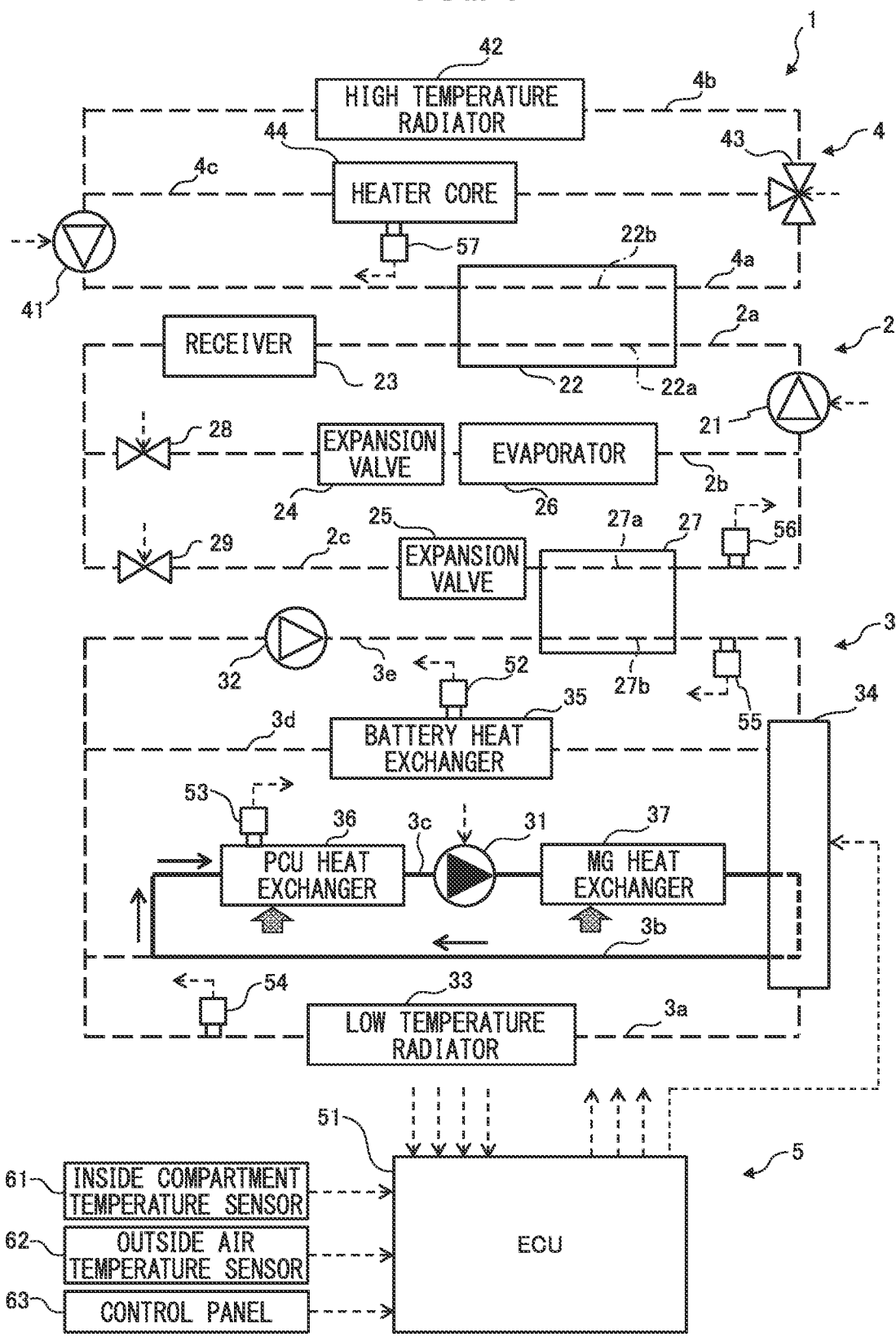
FIG. 4 is a diagram schematically illustrating one flow mode (first stop mode) of a heat medium.
Figure 5:
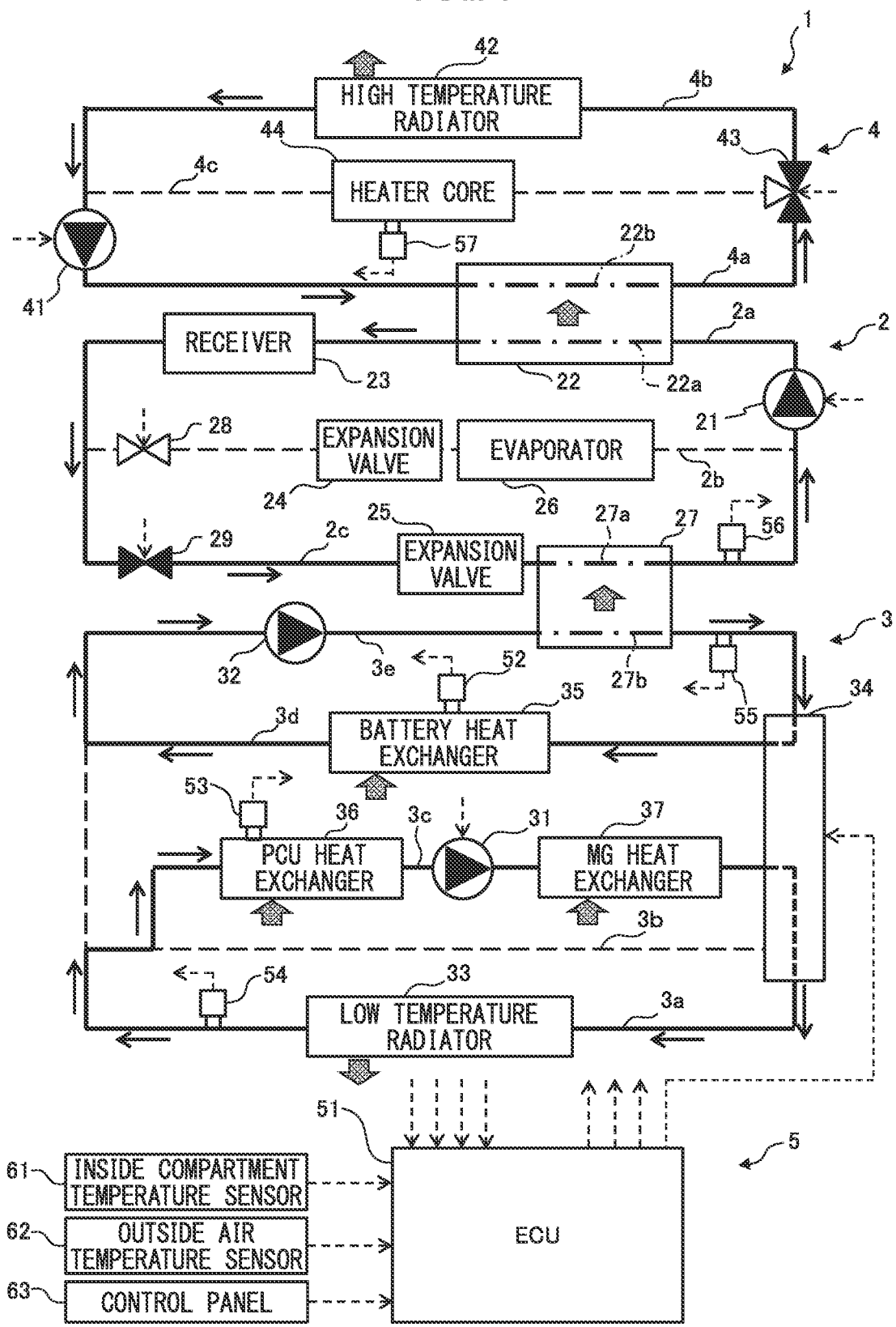
FIG. 5 is a diagram schematically illustrating one flow mode (second stop mode) of the heat medium.

First, with reference to FIGS. 4 and 5, a flow mode (stop mode) of the heat medium when neither the cooling request nor the heating request is described. FIG. 4 is a diagram schematically illustrating a flow mode (first stop mode) of the heat medium in a case where neither the cooling request nor the heating request nor the cooling request of the battery 114 is present. Therefore, in the first stop mode, the PCU 112 and the MG 110 are cooled and the battery 114 is not cooled.

As shown in FIG. 4, in the first stop mode, the first pump 31 of the low-temperature circuit 3 is operated and the second pump 32 is stopped. In addition, in the first stop mode, the five-way valve 34 is set to a first state in which the circulation flow path 3b and the heat generating device flow path 3c are connected. Consequently, in the low-temperature circuit 3, the cooling water circulates through the PCU heat exchanger 36 and the MG heat exchanger 37. On the other hand, in the first stop mode, the compressor 21 and the third pump 41 are stopped. Therefore, the refrigerant does not circulate in the refrigeration circuit 2, and the cooling water does not circulate in the high-temperature circuit 4.

Consequently, in the first stop mode, heat is absorbed from the PCU 112 to the cooling water at the PCU heat exchanger 36, and heat is absorbed from the MG 110 to the cooling water at the MG heat exchanger 37. The heat absorbed by the cooling water is discharged to the outside air while circulating through the low-temperature circuit 3. Therefore, in the first stop mode, heat is absorbed from the PCU 112 and the MG 110, and the heat is released in the low-temperature circuit 3. In the first stop mode, the five-way valve 34 may be set to a third state in which the low-temperature radiator flow path 3a and the heat generating device flow path 3c are connected (see FIG. 5).

FIG. 5 is a diagram schematically illustrating a flow mode (second stop mode) of the heat medium in a case where there is neither a cooling request nor a heating request and there is a cooling request of the battery 114. Therefore, in the second stop mode, the PCU 112, the MG 110 and the battery 114 are cooled.

As shown in FIG. 5, in the second stop mode, the first pump 31 and the second pump 32 of the low-temperature circuit 3 are operated. In addition, in the second stop mode, the five-way valve 34 is set to a third state in which the low-temperature radiator flow path 3a and the heat generating device flow path 3c are connected to each other and the battery flow path 3d and the chiller flow path 3e are connected to each other. Consequently, in the low-temperature circuit 3, the cooling water circulates through the PCU heat exchanger 36, the MG heat exchanger 37, and the low-temperature radiator 33. In addition, another cooling water in the low-temperature circuit 3 circulates through the battery heat exchanger 35 and the chiller 27.

In addition, in the second stop mode, the compressor 21 of the refrigeration circuit 2 is operated, the first electromagnetic regulation valve 28 is closed, and the second electromagnetic regulation valve 29 is opened. Therefore, in the refrigeration circuit 2, the refrigerant circulates through the chiller 27 and the condenser 22 without passing through the evaporator 26. Further, in the second stop mode, the third pump 41 of the high-temperature circuit 4 is operated and the three-way valve 43 is set such that cooling water flows through the high-temperature radiator 42 without passing through the heater core 44.

Consequently, in the second stop mode, heat is absorbed from the PCU 112 and the MG 110 to the cooling water at the PCU heat exchanger 36 and the MG heat exchanger 37, and the heat is released in the low-temperature radiator 33. In addition, in the second stop mode, heat is absorbed from the battery 114 at the battery heat exchanger 35, and heat is transferred from the cooling water of the low-temperature circuit 3 to the refrigerant of the refrigeration circuit 2 at the chiller 27. Further, in the second stop mode, at the condenser 22, heat is transferred from the refrigerant of the refrigeration circuit 2 to the cooling water of the high-temperature circuit 4, and the heat is discharged to the outside air at the high-temperature radiator 42. Therefore, in the second stop mode, heat is absorbed from the PCU 112 and the MG 110, and the heat is released at the low-temperature radiator 33. In addition, heat is absorbed from the battery 114 at the battery heat exchanger 35 and released at the high temperature radiator 42. In the second stop mode, the five-way valve 34 may be set to a first state in which the circulation flow path 3b and the heat generating device flow path 3c are connected to each other (see FIG. 4).

<<Cooling Mode>>

Figure 6:
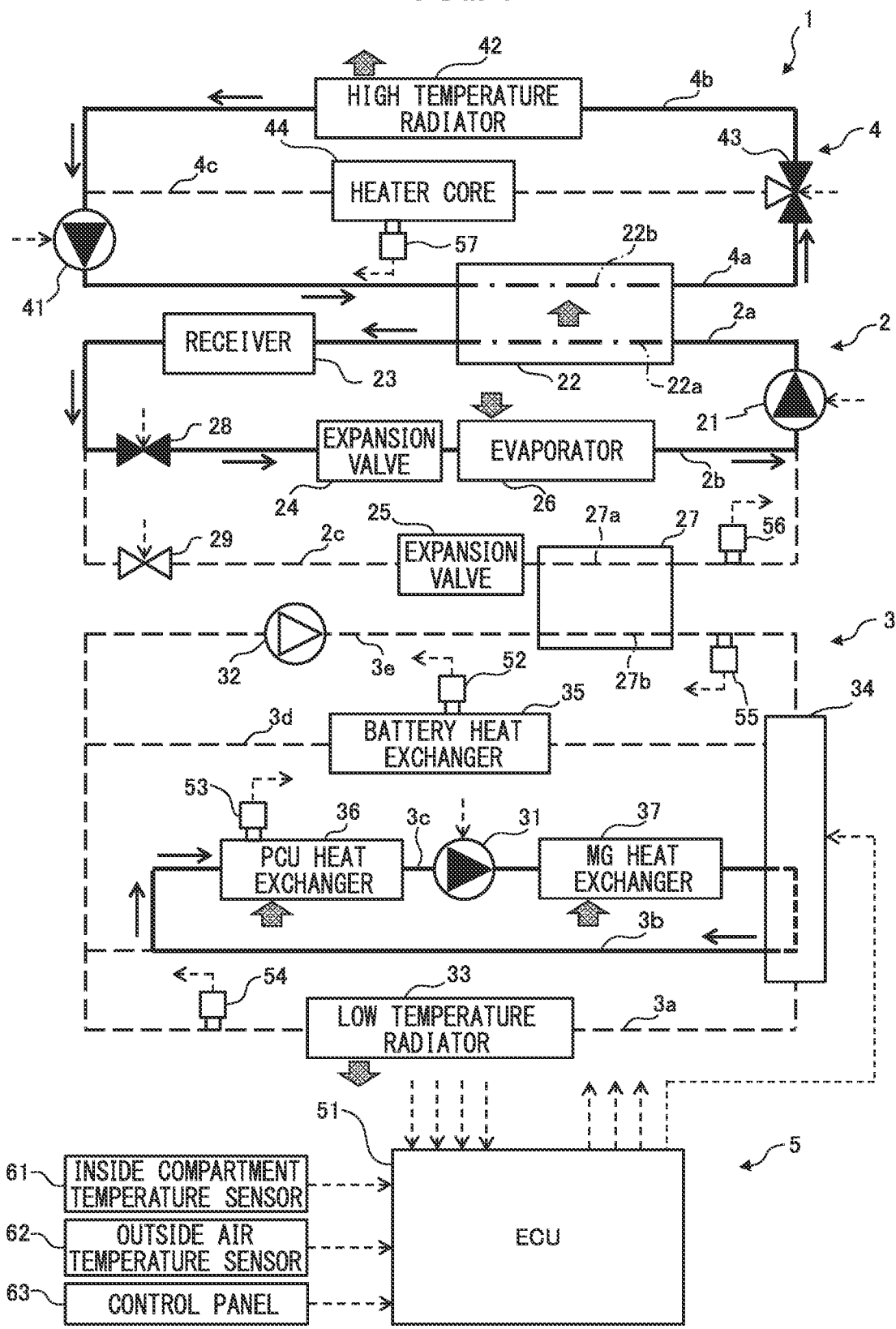
FIG. 6 is a diagram schematically illustrating one flow mode (cooling mode) of the heat medium.

Next, with reference to FIG. 6, a flow mode (cooling mode) of the heat medium when there is a cooling request will be described. FIG. 6 is a diagram schematically illustrating a flow mode (cooling mode) of the heat medium in a case where there is a cooling request and there is no cooling request for the battery 114. Therefore, in the cooling mode shown in FIG. 6, the cooling is performed and the PCU 112 and the MG 110 are cooled.

As shown in FIG. 6, in the cooling mode, the first pump 31 of the low-temperature circuit 3 is operated and the second pump 32 is stopped. In addition, in the cooling mode, the five-way valve 34 is set to a first state in which the circulation flow path 3b and the heat generating device flow path 3c are connected to each other. Consequently, in the low-temperature circuit 3, the cooling water circulates through the PCU heat exchanger 36 and the MG heat exchanger 37.

In addition, in the cooling mode, the compressor 21 of the refrigeration circuit 2 is operated, the first electromagnetic regulation valve 28 is opened, and the second electromagnetic regulation valve 29 is closed. Therefore, in the refrigeration circuit 2, the refrigerant circulates through the evaporator 26 and the condenser 22 without passing through the chiller 27. Further, in the cooling mode, the third pump 41 of the high-temperature circuit 4 is operated, and the three-way valve 43 is set so that the cooling water flows through the high-temperature radiator 42 without passing through the heater core 44.

Consequently, in the cooling mode, heat is absorbed from the PCU 112 and the MG 110, and the heat is released in the low-temperature circuit 3. In addition, in the cooling mode, heat is absorbed from the ambient air to the refrigerant at the evaporator 26, and the heat is transferred from the refrigerant to the cooling water of the high-temperature circuit 4 at the condenser 22. In the high-temperature circuit 4, the heat absorbed to the cooling water at the condenser 22 is released in the high-temperature radiator 42. Therefore, in the cooling mode, heat is absorbed from the surrounding air flowing through the air passage 6 in the evaporator 26, cooling of the interior of the vehicle 100 is performed, and the heat is released at the high-temperature radiator 42.

When there is a cooling request for the battery 114, in the cooling mode, the second pump 32 may be driven and the cooling water may be circulated between the chiller 27 and the battery heat exchanger 35 in the same manner as in the example shown in FIG. 5. In this case, in addition to the first electromagnetic regulation valve 28, the second electromagnetic regulation valve 29 is also opened, whereby a part of the refrigerant circulates through the chiller 27.

<<Heating Mode>>

Figure 7:
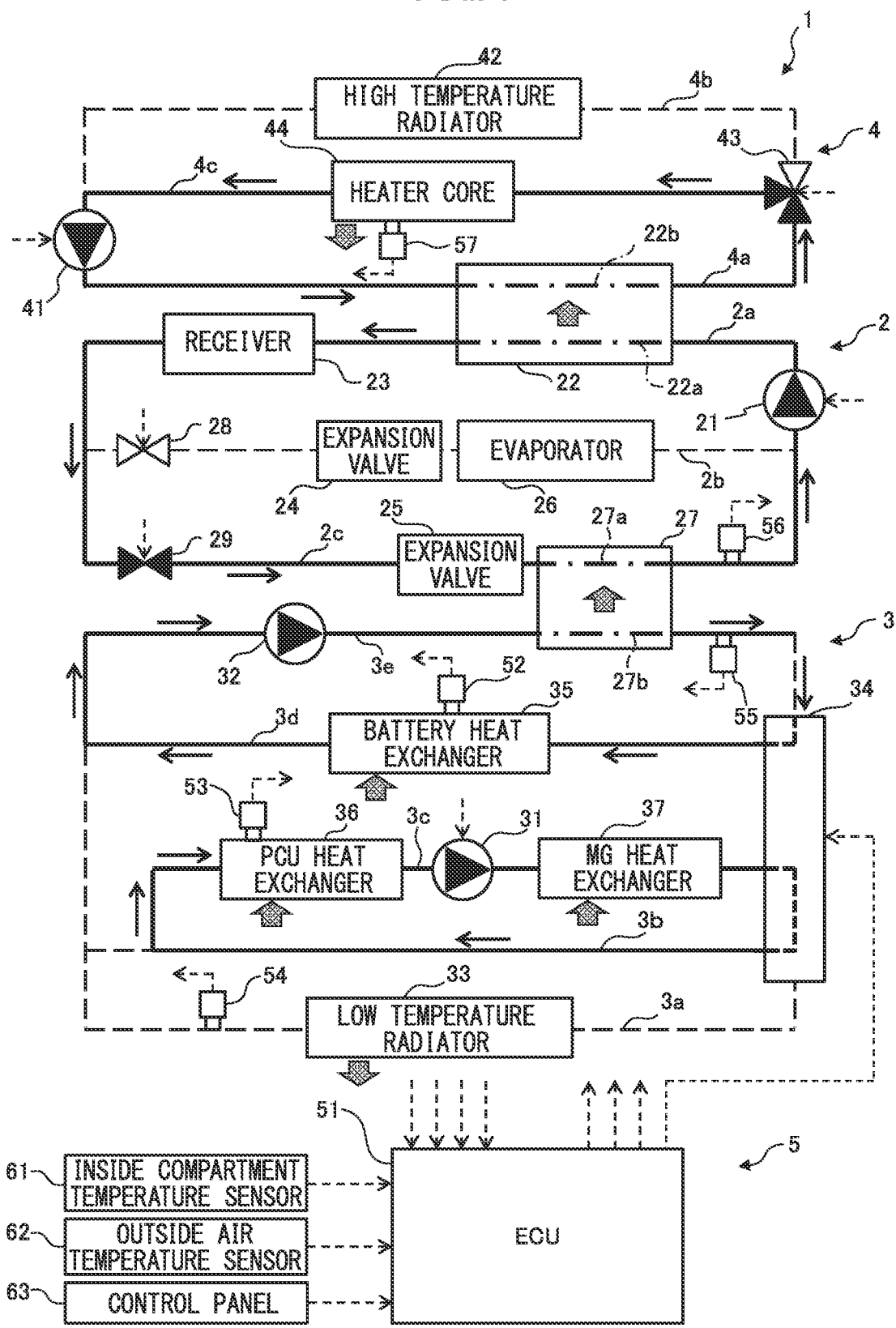
FIG. 7 is a diagram schematically illustrating one flow mode (first heating mode) of the heat medium.

Next, with reference to FIGS. 7 and 8, a flow mode (heating mode) of the heating medium when there is a heating request will be described. FIG. 7 is a diagram schematically illustrating a flow mode (first heating mode) of the heat medium when there are a heating request and a cooling request of the battery 114. Therefore, in the first heating mode, the heating is performed and the PCU 112, the MG 110 and the battery 114 are cooled.

As shown in FIG. 7, in the first heating mode, the first pump 31 and the second pump 32 of the low-temperature circuit 3 are operated. In addition, in the first heating mode, the five-way valve 34 is set to a first state in which the circulation flow path 3b and the heat generating device flow path 3c are connected to each other and the battery flow path 3d and the chiller flow path 3e are connected to each other. Consequently, in the low-temperature circuit 3, the cooling water circulates through the PCU heat exchanger 36 and the MG heat exchanger 37. In addition, another cooling water in the low-temperature circuit 3 circulates through the battery heat exchanger 35 and the chiller 27.

In addition, in the first heating mode, the compressor 21 of the refrigeration circuit 2 is operated, the first electromagnetic regulation valve 28 is closed, and the second electromagnetic regulation valve 29 is opened. Therefore, in the refrigeration circuit 2, the refrigerant circulates through the chiller 27 and the condenser 22 without passing through the evaporator 26. Further, in the first heating mode, the third pump 41 of the high temperature circuit 4 is operated, and the three-way valve 43 is set so that the cooling water flows through the heater core 44 without passing through the high temperature radiator 42.

Consequently, in the first heating mode, heat is absorbed from the PCU 112 and the MG 110, and the heat is released in the low-temperature circuit 3. In addition, in the first heating mode, heat is absorbed from the battery 114 at the battery heat exchanger 35, and heat is transferred from the cooling water of the low-temperature circuit 3 to the refrigerant of the refrigeration circuit 2 at the chiller 27. Further, in the first heating mode, at the condenser 22, heat is transferred from the refrigerant of the refrigeration circuit 2 to the cooling water of the high-temperature circuit 4, and the heat is released to the surrounding air at the heater core 44. Therefore, in the first heating mode, heat is absorbed from the battery 114 at the battery heat exchanger 35, and the heat is released to the surrounding air flowing through the air passage 6 at the heater core 44, so that the interior of the vehicle 100 is heated. In the present embodiment, at this time, the air mix door 72 is basically adjusted so that all the air flows through the heater core 44, i.e., the heater passing ratio becomes maximum.

Figure 8:
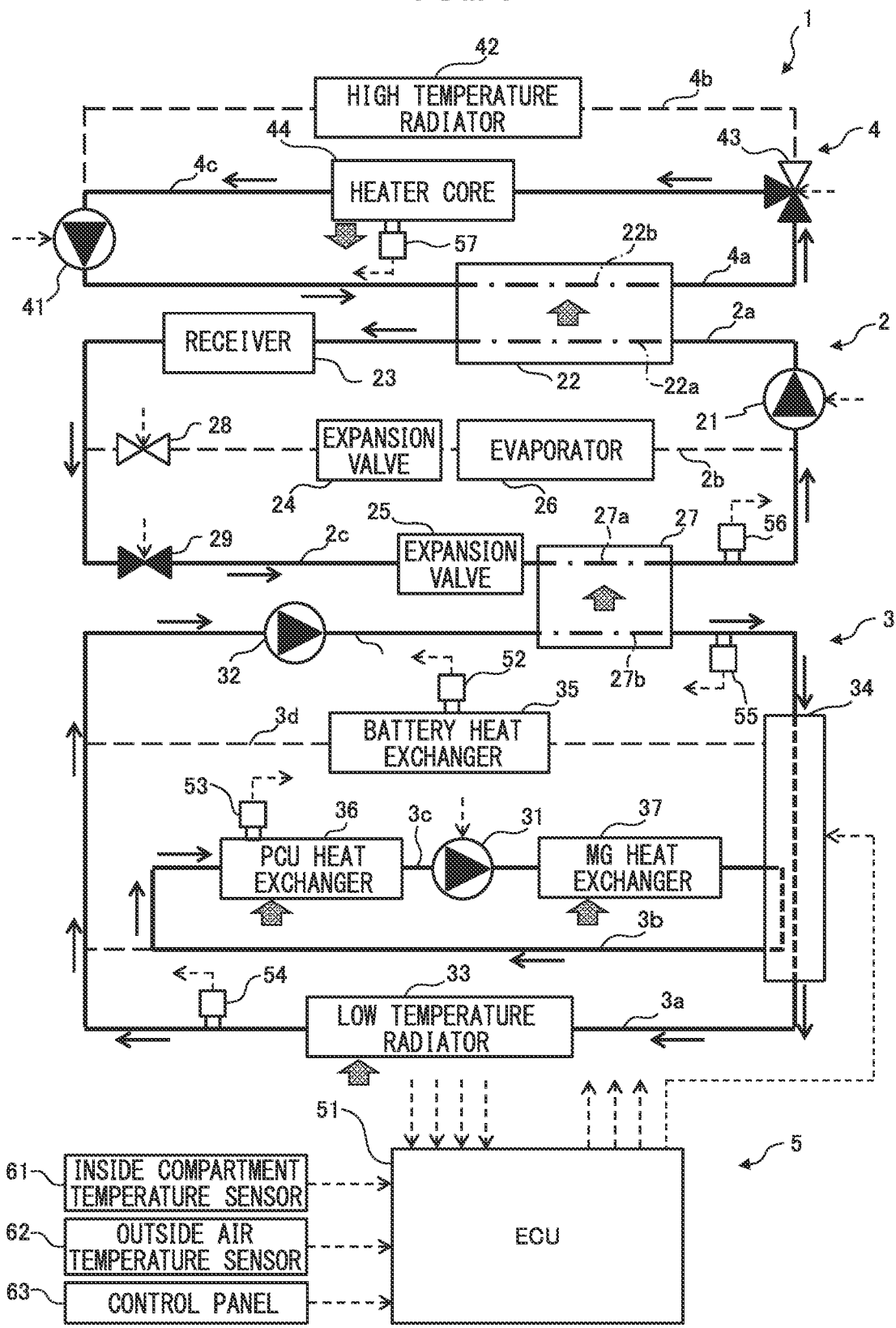
FIG. 8 is a diagram schematically illustrating one flow mode (second heating mode) of the heat medium.

FIG. 8 is a diagram schematically illustrating a flow mode (second heating mode) of the heat medium when there is a heating request and there is no cooling request for the battery 114. Therefore, in the first heating mode, the heating is performed and the PCU 112 and the MG 110 are cooled.

As shown in FIG. 8, the second heating mode differs from the first heating mode only in the connection state of the five-way valve 34 of the low-temperature circuit 3. In the second heating mode, the five-way valve 34 is set to a second state in which the low-temperature radiator flow path 3a and the chiller flow path 3e are connected to each other and the circulation flow path 3b and the heat generating device flow path 3c are connected to each other. Consequently, in the second heating mode, heat is absorbed from the PCU 112 and the MG 110 into the cooling water in the PCU heat exchanger 36 and the MG heat exchanger 37. In addition, in the second heating mode, heat is absorbed from the outside air to the cooling water of the low-temperature circuit 3 in the low-temperature radiator 33, and the heat is transferred from the cooling water to the refrigerant of the refrigeration circuit 2 in the chiller 27, and finally, the heat is discharged to the surrounding air in the heater core 44. Therefore, in the second heating mode, heat is absorbed from the outside air at the low-temperature radiator 33, and the heat is released to the surrounding air flowing through the air passage 6 at the heater core 44, so that the interior of the vehicle 100 is heated. In the present embodiment, at this time, the air mix door 72 is basically adjusted so that all the air flows through the heater core 44, i.e., the heater passing ratio becomes maximum.

<Control of Compressor, Expansion Valve and Air Mix Door>

Figure 9:
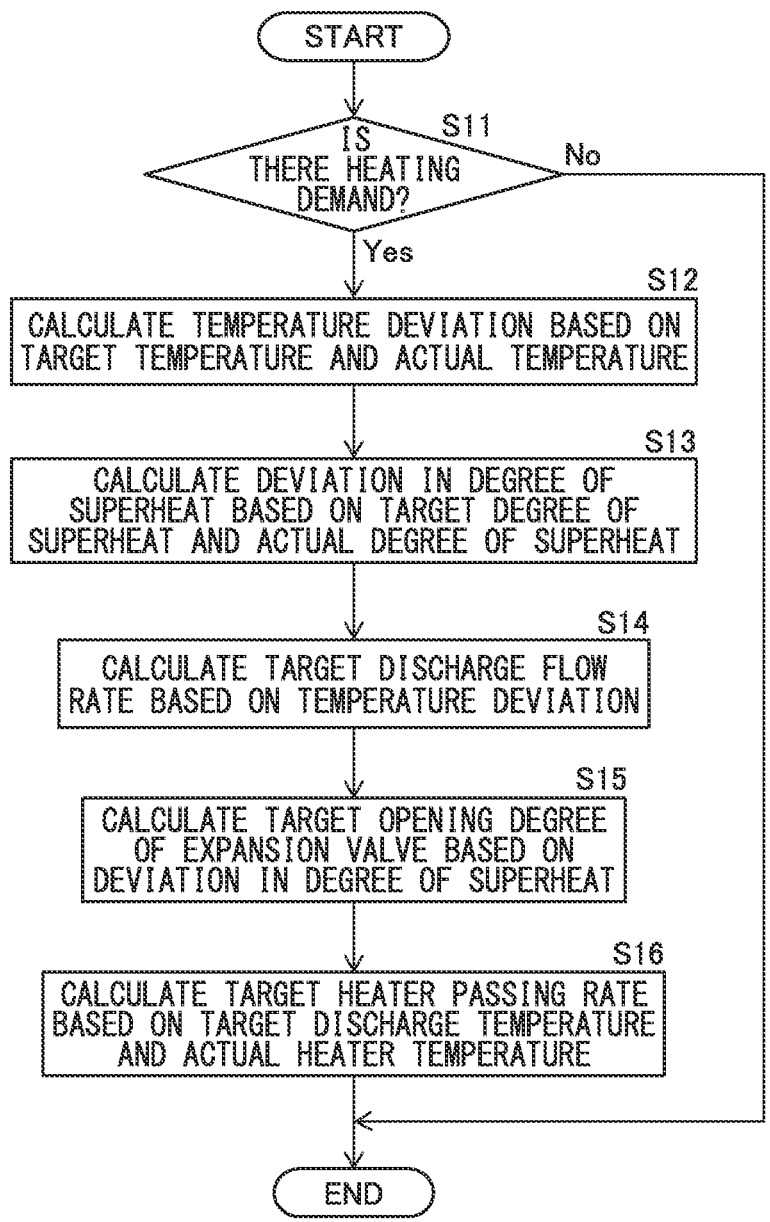
FIG. 9 is a flowchart illustrating a flow of a process for controlling the compressor, a second expansion valve and an air mix door, in the heating mode.

Next, with reference to FIG. 9, the control of the compressor 21, the second expansion valve 25, and the air mix door 72 in the heating mode will be briefly described. In the present embodiment, the target discharge flow rate (target output) of the compressor 21 is feedback-controlled so that the temperature of the cooling water flowing through the heater core 44 (hereinafter, also referred to as "heater temperature") or the temperature of the air flowing into the interior from the air passage 6 (hereinafter, also referred to as "blowoff temperature") becomes the target temperature. Further, the opening degree of the second expansion valve 25 is feedback-controlled so that the degree of superheat of the refrigerant flowing out from the chiller 27 becomes the target degree of superheat. Further, the heater passing ratio in the air mix door 72 is feedback-controlled so that the blowoff temperature becomes the target blowoff temperature set based on the set temperature set by the user. The target blowoff temperature may be the same temperature as the set temperature.

FIG. 9 is a flowchart illustrating a flow of processing for controlling the compressor 21, the second expansion valve 25, and the air mix door 72 in the heating mode. The flow chart shown in FIG. 9 is executed by the ECU 51 at regular intervals.

As shown in FIG. 9, the ECU 51 first determines whether there is a heating demand (step S11). In the present embodiment, the ECU 51 determines the presence or absence of a heating demand based on the output signals from the indoor temperature sensor 61, the outside air temperature sensor 62, and the operation panel 63. When it is determined that there is no heating demand at step S11, the process is terminated.

On the other hand, when it is determined that there is the heating demand at step S11, the ECU 51 calculates a deviation between the target heater temperature and the actual heater temperature, or a deviation between the target blowoff temperature and the actual blowoff temperature (step S12). The target heater temperature or the target blowoff temperature is set by the target value setting process described with reference to FIG. 12. In the present embodiment, during the normal control in which a large change in the temperature of the cooling water flowing through the chiller 27 is not predicted, the target heater temperature or the target blowoff temperature is calculated based on the output signals from the indoor temperature sensor 61 and the operation panel 63. The actual blowoff temperature is detected by, for example, the blowoff temperature sensor 58, and the actual heater temperature is detected by, for example, the heater core water temperature sensor 57.

Thereafter, the ECU 51 calculates the deviation between the target degree of superheat and the actual degree of superheat of the cooling water flowing out from the chiller 27 (step S13). The target degree of superheat is set by the target value setting process described with reference to FIG. 12. In the present embodiment, during the normal control performed when a large change in the temperature of the cooling water flowing through the chiller 27 is not predicted, the target degree of superheat may be set to a predetermined constant value, or may be set based on the target blowoff temperature, the target heater temperature, the temperature of the cooling water detected by the chiller water temperature sensor 55, and the like. The actual degree of superheat is calculated based on, for example, the output of the temperature and pressure sensor 56 that detects the temperature and pressure of the refrigerant flowing out from the chiller 27.

Next, the ECU 51 calculates the target discharge flow rate of the compressor 21 so that the deviation of the temperature (deviation of the blowoff temperature or deviation of the heater temperature) becomes zero based on the deviation calculated at step S12 (step S14). Then, the ECU 51 controls the compressor 21 so that the discharge flow rate of the compressor 21 becomes the calculated target discharge flow rate.

Next, the ECU 51 calculates the target expansion valve opening degree of the second expansion valve 25 based on the deviation of the degree of superheat calculated at step S14 so that the deviation becomes zero (step S15). Then, the ECU 51 controls the second expansion valve 25 so that the opening degree of the second expansion valve 25 becomes the target expansion valve opening degree.

Next, the ECU 51 calculates the target heater passing ratio of the air mix door 72 based on the target blowoff temperature and the actual heater temperature detected at step S12 (step S16). Specifically, the target heater passing ratio is calculated so as to be smaller as the target blowoff temperature is lower with respect to the actual heater temperature. As a result, as the target blowoff temperature becomes lower with respect to the actual heater temperature, the ratio of the air flowing through the heater core 44 decreases, and thus the blowoff temperature decreases with respect to the heater temperature. Since the heater temperature is normally controlled to become approximately the same as the target blowoff temperature, the target heater passing ratio is normally controlled to be substantially maintained at the maximum. In any case, in the present embodiment, the ECU 51 controls the heater passing ratio in the air mix door 72 so that the temperature (blowoff temperature) of the air flowing into the interior of the vehicle 100 becomes the target blowoff temperature, based on the actual heater temperature.

In the present embodiment, the target heater passing ratio is calculated based on the target blowoff temperature and the actual heater temperature. However, the target heater passing ratio may be calculated by another method as long as the blowoff temperature is calculated to be the target blowoff temperature set based on the set temperature set by the user. Therefore, the target heater passing ratio may be calculated so that the difference between the target blowoff temperature and the actual blowoff temperature becomes small, based on these temperatures, for example. Alternatively, the target heater passing ratio may be calculated based on the target blowoff temperature, the actual blowoff temperature, and the actual heater temperature.

<Change in the Blowoff Temperature at the Time of Switching the Five-Way Valve>

Incidentally, when the discharge flow rate of the compressor 21 and the opening degree of the second expansion valve 25 is feedback-controlled as described above, the blowoff temperature into the interior of the vehicle 100 may be greatly reduced, for example when switching the connection state of the five-way valve 34 during heating. In particular, when the connection state of the five-way valve 34 is switched from a state in which the cooling water flowing through the heat exchanger with the heat generating device such as the battery heat exchanger 35 flows into the chiller 27 to a state in which the cooling water flowing through the low-temperature radiator 33 flows into the chiller 27 without passing through the heat exchanger with the heat generating device, a decrease in the blowoff temperature is likely to occur.

Figure 10:
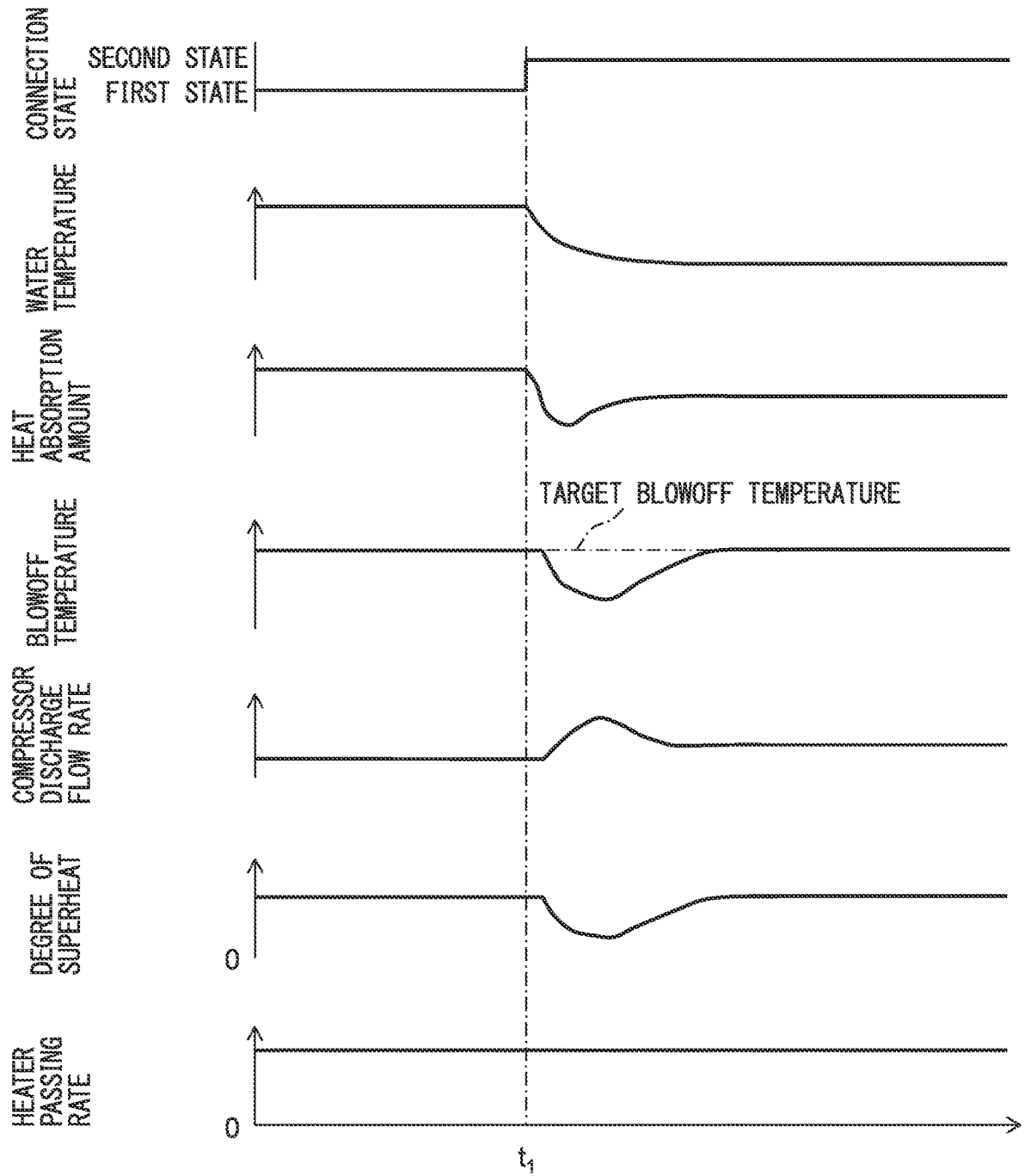
FIG. 10 is a time chart of a connection state of a five-way valve, etc.

This state will be described with reference to FIG. 10. FIG. 10 is a time chart of the connection state of the five-way valve 34, the temperature of the cooling water flowing through the chiller 27, the amount of heat absorbed from the cooling water to the refrigerant at the chiller 27, the blowoff temperature into the interior of the vehicle 100, the discharge flow rate (output) of the compressor 21, the degree of superheat of the refrigerant flowing out from the chiller 27, and the heater passing ratio of the air mix door 72. In the embodiment shown in FIG. 10, at the time $t_1$, the operation mode of the in-vehicle temperature control system 1 is switched from the first heating mode to the second heating mode. That is, in the embodiment shown in FIG. 10, the connecting state of the five-way valve 34 is switched from the first state (FIG. 7) to the second state (FIG. 8) at the time $t_1$.

As shown in FIG. 10, when the connection state of the five-way valve 34 is switched from the first state to the second state, the temperature of the cooling water flowing through the chiller 27 decreases. This is because, in the first state, the relatively high-temperature cooling water that has passed through the battery heat exchanger 35 flows into the chiller 27, whereas in the second state, the relatively low-temperature cooling water that has passed through the low-temperature radiator 33 flows into the chiller 27. When the temperature of the cooling water decreases in this way, the amount of heat absorption from the cooling water to the refrigerant at the chiller 27 decreases accordingly. As a result, the amount of heat absorbed from the refrigerant to the cooling water at the condenser 22 decreases, the temperature of the cooling water flowing through the heater core 44 decreases, and thus the blowoff temperature into the interior of the vehicle 100 decreases as shown in FIG. 10. When the blowoff temperature into the interior of the vehicle 100 is reduced as described above, the discharge flow rate of the compressor 21 is increased by the feedback control, the temperature of the refrigerant in the condenser 22 is increased, the amount of heat absorbed from the refrigerant to the cooling water at the condenser 22 is increased, and as a result, the blowoff temperature into the interior of the vehicle 100 is increased.

Here, since the feedback control is performed based on the heater temperature or the blowoff temperature, the discharge flow rate of the compressor 21 is increased when the heater temperature or the blowoff temperature decreases. For this reason, the discharge flow rate of the compressor 21 is increased with a delay after the temperature of cooling water flowing through the chiller 27 decreases, and as shown in FIG. 10, the blowoff temperature into the interior of the vehicle 100 temporarily decreases. As a result, the air-conditioning comfort of the occupant of the vehicle 100 may deteriorate.

<Temperature Control During Heating>

Therefore, in the present embodiment, during the heating of the interior of the vehicle 100, if it is predicted that the temperature of the cooling water flowing through the chiller 27 is reduced by a predetermined reference value or more, before the temperature of the cooling water flowing through the chiller 27 is reduced by the reference value or more, the control device 5 controls the heat transfer amount adjusting device so that the heat transfer amount which is absorbed to the refrigerant at the chiller 27 and is dissipated from the refrigerant to the cooling water of the high-temperature circuit 4 at the condenser 22 is increased, and controls the air mix door 72 so that the heater passing ratio is decreased. In particular, in the present embodiment, in a case where it is predicted that the temperature of the cooling water flowing through the chiller 27 decreases by the reference value or more, the heat transfer amount adjusting device is controlled so that the heat transfer amount increases as the predicted value of the amount of decrease in the temperature of the cooling water flowing through the chiller 27 increases.

Further, in the present embodiment, the ECU 51 predicts whether or not the temperature of the cooling water decreases by the reference value or more when the five-way valve 34 is switched, based on the temperature of the cooling water detected by the battery water temperature sensor 52, the PCU water temperature sensor 53, the radiator water temperature sensor 54, and the chiller water temperature sensor 55. More specifically, the ECU 51 predicts an amount of decrease in the temperature of the cooling water flowing through the chiller 27 when the five-way valve 34 is switched, that is, when the flow path in the low-temperature circuitry 3 is switched, based on the temperature detected by these sensors. Then, when the preliminary switching notice for switching the connecting state of the five-way valve 34 after a predetermined period of time is issued in a state in which the amount of decrease in the temperature predicted in this manner is the reference value or more, the ECU 51 predicts that the temperature of the cooling water flowing through the chiller 27 decreases by the reference value or more.

In particular, in the present embodiment, the temperature of the cooling water when the five-way valve 34 is switched is predicted, based on the temperature of the cooling water flowing through the flow path in which the cooling water does not circulate before the five-way valve 34 is switched and the cooling water circulates after the five-way valve 34 is switched, and the temperature of the cooling water flowing through the chiller 27. For example, in the case where the five-way valve 34 is switched from the first state to the second state, the amount of decrease in the temperature of the cooling water when the five-way valve 34 is switched, based on the temperature of the cooling water flowing through the low-temperature radiator flow path 3a in which the cooling water does not circulate before the five-way valve 34 is switched and the cooling water circulates after the five-way valve is switched, and the temperature of the cooling water flowing through the chiller 27. Specifically, the amount of decrease in the temperature of the cooling water when the five-way valve 34 is switched is predicted based on the temperature of the cooling water detected by the radiator water temperature sensor 54 and the chiller water temperature sensor 55 before the five-way valve 34 is switched. In particular, the predicted value of the amount of decrease in the temperature of the cooling water when the five-way valve 34 is switched is set to a value smaller than the difference between the temperature of the cooling water detected by the radiator water temperature sensor 54 and the temperature of the cooling water detected by the chiller water temperature sensor 55 before the five-way valve 34 is switched.

Figure 11:
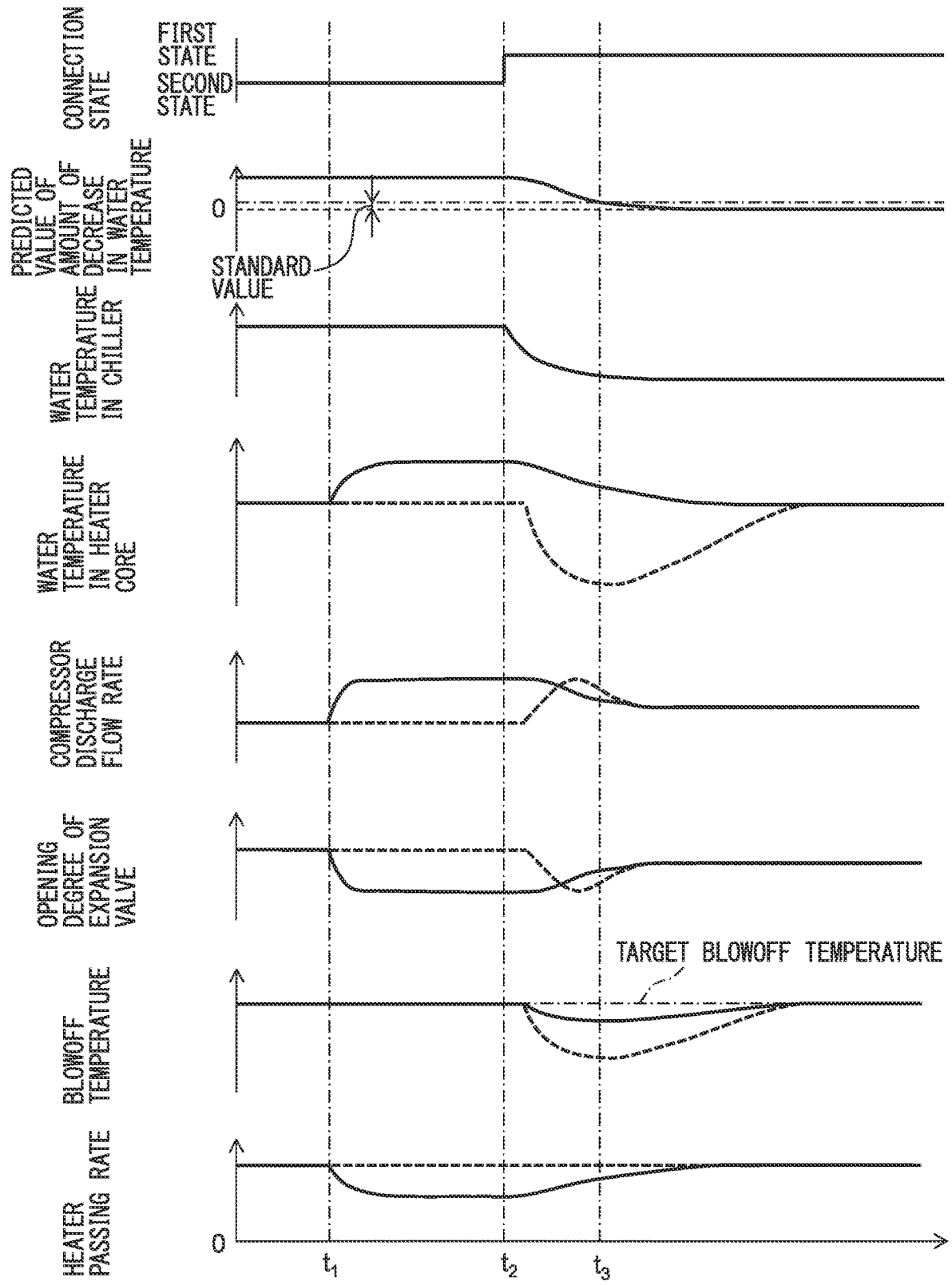
FIG. 11 is a time chart, similar to FIG. 10, of the connection state of a five-way valve, etc.

FIG. 11 is a time chart, similar to FIG. 10, of the connection state of the five-way valve 34, etc. A broken line in the figure indicates a transition of each parameter in a case where the temperature control according to the present embodiment is not performed (similar to FIG. 10). Further, the predicted value of the amount of decrease in the water temperature in the figure represents a predicted value of the amount of decrease in the temperature of the cooling water when the connection state of the five-way valve 34 is switched. In the embodiment shown in FIG. 11, before the time $t_1$, the discharge flow rate of the compressor 21 and the opening degree of the second expansion valve 25 are controlled by the normal control described with reference to FIG. 9. Further, the heater passing ratio in the air mix door 72 is controlled so that the blowoff temperature becomes the target blowoff temperature. In particular, before the time $t_1$, since the temperature of the cooling water flowing through the heater core 44 is controlled to be a temperature corresponding to the blowoff temperature, the air mix door 72 is adjusted so that all air flows through the heater core 44, that is, the heater passage ratio is maximized.

In the embodiment illustrated in FIG. 11, the predicted value of the amount of decrease in the temperature of the cooling water is equal to or greater than the reference value before the time $t_1$. Then, in the embodiment shown in FIG. 11, at the time $t_1$, a preliminary switching notice is issued for switching the connecting state of the five-way valve 34 from the first state to the second state after a predetermined period of time. The preliminary switching notice is issued, for example, when the temperature of the battery 114 detected by the battery temperature sensor 64 decreases and the ECU 51 stops the cooling demand of the battery 114.

At the time $t_1$, when the preliminary switching notice of the five-way valve 34 is issued in a state in which the predicted value of the amount of decrease in the temperature of the cooling water is the reference value or more, that is, when it is predicted that the temperature of the cooling water flowing through the chiller 27 decreases by the reference value or more, the compressor 21 and the second expansion valve 25 are controlled so that the heat transfer amount increases. Specifically, the compressor 21 is controlled so as to increase the discharge flow rate so as to facilitate heat exchange at the chiller 27. In addition, the second expansion valve 25 is controlled so that its opening degree is reduced in order to promote heat exchange at the chiller 27 and suppress a decrease in the degree of superheat of the refrigerant flowing out from the chiller 27.

In particular, in the present embodiment, the compressor 21 is controlled such that the discharge flow rate increases as the predicted value of the amount of decrease in the temperature of the cooling water flowing through the chiller 27 increases. Further, the second expansion valve 25 is controlled such that the opening degree thereof decreases as the predicted value of the amount of decrease in the temperature of the cooling water flowing through the chiller 27 increases. Therefore, in the present embodiment, the compressor 21 and the second expansion valve 25 are controlled such that the heat transfer amount increases as the predicted value of the amount of decrease in the temperature of the cooling water flowing through the chiller 27 increases.

When the discharge flow rate of the compressor 21 is increased and the opening degree of the second expansion valve 25 is decreased at the time $t_1$, the amount of heat transferred from the cooling water of the low-temperature circuit 3 to the cooling water of the high-temperature circuit 4 via the refrigeration circuit 2 is increased, so that the temperature of the cooling water flowing through the heater core 44 is increased. Therefore, the temperature of the cooling water flowing through the heater core 44 at this time is higher than the temperature corresponding to the target blowoff temperature.

On the other hand, the air mix door 72 is controlled so that the blowoff temperature becomes the target blowoff temperature as described above. Therefore, the heater passing ratio is controlled so that the blowoff temperature becomes the target blowoff temperature, when the temperature of the cooling water flowing through the heater core 44 increases after the time $t_1$. Specifically, the air mix door 72 is controlled so that the heater passing ratio becomes low after the time $t_1$. Consequently, even after the time $t_1$, the blowoff temperature is maintained at the target blowoff temperature.

In the embodiment shown in FIG. 11, the connected state of the five-way valve 34 is then switched from the first state to the second state at time $t_2$. When the connection state of the five-way valve 34 is switched at the time $t_2$, the temperature of the cooling water flowing through the chiller 27 decreases. When the temperature of the cooling water flowing through the chiller 27 decreases, the amount of heat transferred from the cooling water of the low-temperature circuit 3 to the cooling water of the high-temperature circuit 4 decreases, and the temperature of the cooling water flowing through the heater core 44 gradually decreases. However, since the temperature of the cooling water flowing through the heater core 44 is high in advance after the time $t_1$, even if the temperature of the cooling water flowing through the heater core 44 after the time $t_2$ decreases, the temperature of the cooling water flowing through the heater core 44 does not decrease much.

Further, when the temperature of the cooling water flowing through the heater core 44 gradually decreases, the predicted value of the amount of decrease in the temperature of the cooling water flowing through the chiller 27 gradually decreases. As a result, the discharge flow rate of the compressor 21 is gradually decreased, and the opening degree of the second expansion valve 25 is gradually increased. If the discharge flow rate of the compressor 21 and the opening degree of the second expansion valve 25 are controlled in this manner, the temperature of the cooling water flowing through the heater core 44 gradually decreases, and gradually approaches the temperature corresponding to the target blowoff temperature.

Thereafter, when the predicted value of the amount of decrease in the temperature of the cooling water becomes less than the reference value at the time $t_3$, the control of the compressor 21 for increasing the discharge flow rate and the control of the second expansion valve 25 for decreasing the opening degree are ended. Therefore, the discharge flow rate of the compressor 21 and the opening degree of the second expansion valve 25 are normally controlled.

As described above, according to the present embodiment, when it is predicted that the temperature of the cooling water flowing through the chiller 27 decreases by the reference value or more, the compressor 21 and the second expansion valve 25 are controlled so that the heat transfer amount increases, and the air mix door 72 is controlled so that the heater passing ratio decreases. As a result, it is possible to suppress a change in the blowoff temperature into the interior of the vehicle 100, and thus it is possible to suppress deterioration in the air-conditioning comfort of the occupant of the vehicle 100.

Figure 12:
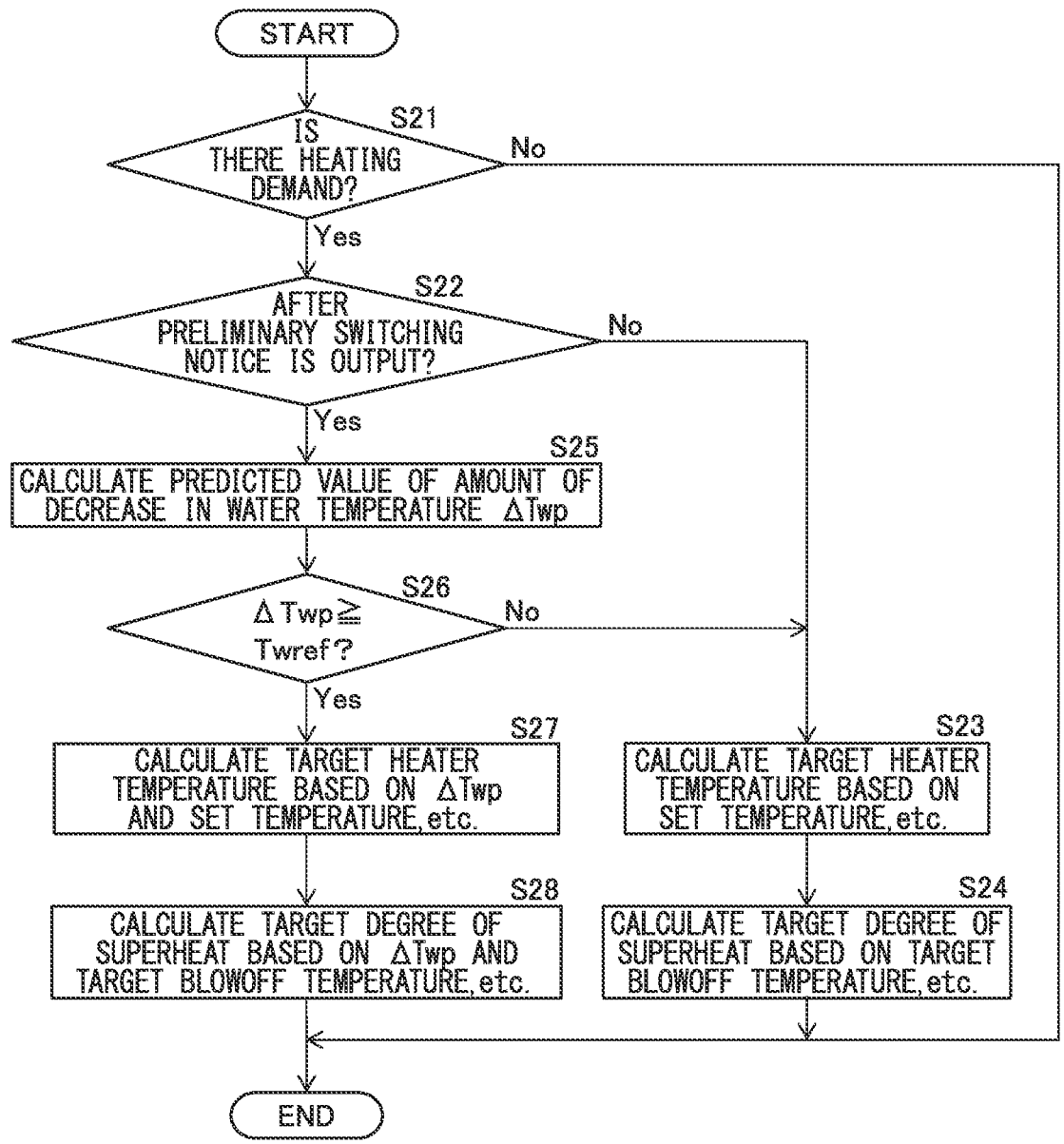
FIG. 12 is a flowchart illustrating flow of a target value set process for setting a target heater temperature and a target degree of superheat.

FIG. 12 is a flowchart illustrating a flow of a target value setting process for setting a target heater temperature and a target degree of superheat. The illustrated flowchart is executed at regular time intervals.

As shown in FIG. 12, the ECU 51 first determines whether or not there is a heating demand (step S21), as at step S11 of FIG. 9. When it is determined that there is no heating demand at step S21, the process is terminated.

On the other hand, when it is determined that there is a heating demand at step S21, the ECU 51 determines whether or not a preliminary switching notice for switching the five-way valve 34 from the first state to the second state is output (step S22). When it is determined at step S22 that the preliminary switching notice has not been output, the ECU 51 calculates the target heater temperature (or the target blowoff temperature) based on the set temperature set by the user using the indoor temperature sensor 61 and the operation panel 63 or the like (step S23). In addition, the ECU 51 calculates the target degree of superheat based on the target blowoff temperature, the target heater temperature, the temperature of the cooling water detected by the chiller water temperature sensor 55, and the like (step S24). Alternatively, the target degree of superheat may be a predetermined constant value. The target heater temperature (or target blowoff temperature) and the target degree of superheat calculated in this way are used at steps S12 and S13 of FIG. 9.

Further, when it is determined at step S22 that the preliminary switching notice is output, the ECU 51 calculates a predicted value $\Delta Twp$ of the amount of decrease in the temperature of the cooling water flowing through the chiller 27 when the connecting state of the five-way valve 34 is switched (step S25). The ECU 51 calculates the predicted value $\Delta Twp$ based on the temperature of the cooling water detected by the battery water temperature sensor 52, the PCU water temperature sensor 53, the radiator water temperature sensor 54, the chiller water temperature sensor 55, and the like.

Next, the ECU 51 determines whether or not the predicted value $\Delta Twp$ calculated at step S22 is equal to or greater than the reference value Twref (step S26). When it is determined at step S26 that the predicted value $\Delta Twp$ is less than the reference value Twref, the ECU 51 calculates the target heater temperature (or the target blowoff temperature) based on the set temperature set by the user using the operation panel 63 or the like (step S23), and calculates the target degree of superheat based on the target blowoff temperature or the like (step S24).

On the other hand, when it is determined that the predicted value ΔTwp is the reference value Twref or more at step S26, the ECU 51 calculates the target heater temperature (or the target blowoff temperature) based on the predicted value ΔTwp of the amount of decrease in the temperature of the cooling water, the set temperature set by the user using the operation panel 63, and the like (step $27).

Specifically, the ECU 51 provisionally calculates the target heater temperature based on the set temperature set by the user or the like (hereinafter, this temperature is referred to as "reference heater temperature"), as at step S23. In addition, the ECU 51 calculates a temperature (provisional rising temperature) to be temporarily raised with respect to the reference heater temperature. This provisional rising temperature is calculated based on a predicted value ΔTwp of the amount of decrease in the temperature of the cooling water flowing through the chiller 27 or the like, and is increased as the predicted value ΔTwp of the amount of decrease in the temperature of the cooling water increases. Then, the ECU 51 calculates the target heater temperature by adding the calculated provisional rising temperature to the calculated reference heater temperature. Therefore, the target heater temperature is higher than the reference heater temperature calculated based on the set temperature set by the user or the like.

The target heater temperature calculated in this way is used at step S12 of FIG. 9. Therefore, the compressor 21 is operated so as to have a larger discharge flow rate than in the normal control. As a result, the heat transfer amount to be absorbed by the refrigerant at the chiller 27 and dissipated from the refrigerant to the cooling water of the high-temperature circuit 4 at the condenser 22 increases.

Next, the ECU 51 calculates the target degree of superheat based on the predicted value ΔTwp of the amount of decrease in the temperature of the cooling water, the target blowoff temperature, and the like (step S28). Specifically, the ECU 51 provisionally calculates the target degree of superheat based on the target blowoff temperature or the like (hereinafter, this degree of superheat is referred to as "reference degree of superheat"), similarly to step S24. In addition, the ECU 51 calculates the degree of superheat (provisional rising degree of superheat) to be temporarily raised relative to the reference degree of superheat. The provisional rising degree of superheat is calculated based on a predicted value ΔTwp of the amount of decrease in the temperature of the cooling water flowing through the chiller 27 or the like, and is increased as the predicted value ΔTwp of the amount of decrease in the temperature of the cooling water increases. Then, the ECU 51 calculates the target degree of superheat by adding the calculated provisional rising degree of superheat to the calculated reference degree of superheat. Therefore, the target degree of superheat is higher than the reference degree of superheat calculated based on the target blowoff temperature or the like.

The target degree of superheat calculated in this way is used at step S13 of FIG. 9. Therefore, the opening degree of the second expansion valve 25 is made smaller so that the degree of superheat becomes higher than in the normal control. As a result, the heat transfer amount to be absorbed by the refrigerant at the chiller 27 and dissipated from the refrigerant to the cooling water of the high-temperature circuit 4 at the condenser 22 increases.

As described above, according to the present embodiment, when it is determined that the predicted value ΔTwp is the reference value Twref or more, the heat transfer amount is increased. As a result, the temperature of the cooling water flowing into the heater core 44 increases, and thus the heater temperature becomes higher than the target blowoff temperature. Here, as described with respect to step S16 of FIG. 9, the air mix door 72 controls the heater passing ratio so that the blowoff temperature becomes the target blowoff temperature based on the actual heater temperature. Therefore, the heater passing ratio of the air mix door 72 is controlled to be lower than the maximum value.

Modification

In the above embodiment, when the predicted value of the amount of decrease in the temperature of the cooling water flowing through the chiller 27 is the reference value or more, the target heater temperature and the target degree of superheat are adjusted. However, in such a case, other parameters may be adjusted without adjusting the target heater temperature or the target degree of superheat. However, even in this case, other parameters are adjusted so that the heat transfer amount absorbed by the refrigerant at the first heat exchanger in the refrigeration circuit and dissipated from the refrigerant at the heat dissipating portion is increased. Specifically, for example, in such cases, the target discharge amount calculated at step S14 of FIG. 9 and the target expansion valve opening degree calculated at step S15 of FIG. 9 may be adjusted.

Further, in the above embodiment, when the preliminary switching notice of the five-way valve 34 is issued in a state in which the predicted value of the amount of decrease in the temperature of the cooling water is the reference value or more, the prediction that the temperature of the cooling water flowing through the chiller 27 decreases by the reference value or more is performed. However, if the predicted value of the amount of decrease in the temperature of the cooling water is the reference value or more, the prediction that the temperature of the cooling water flowing through the chiller 27 decreases by the reference value or more may be performed at an arbitrary timing before the switching of the five-way valve 34 is performed (therefore, before the temperature of the cooling water flowing through the chiller 27 decreases by the reference value or more).

Figure 13:
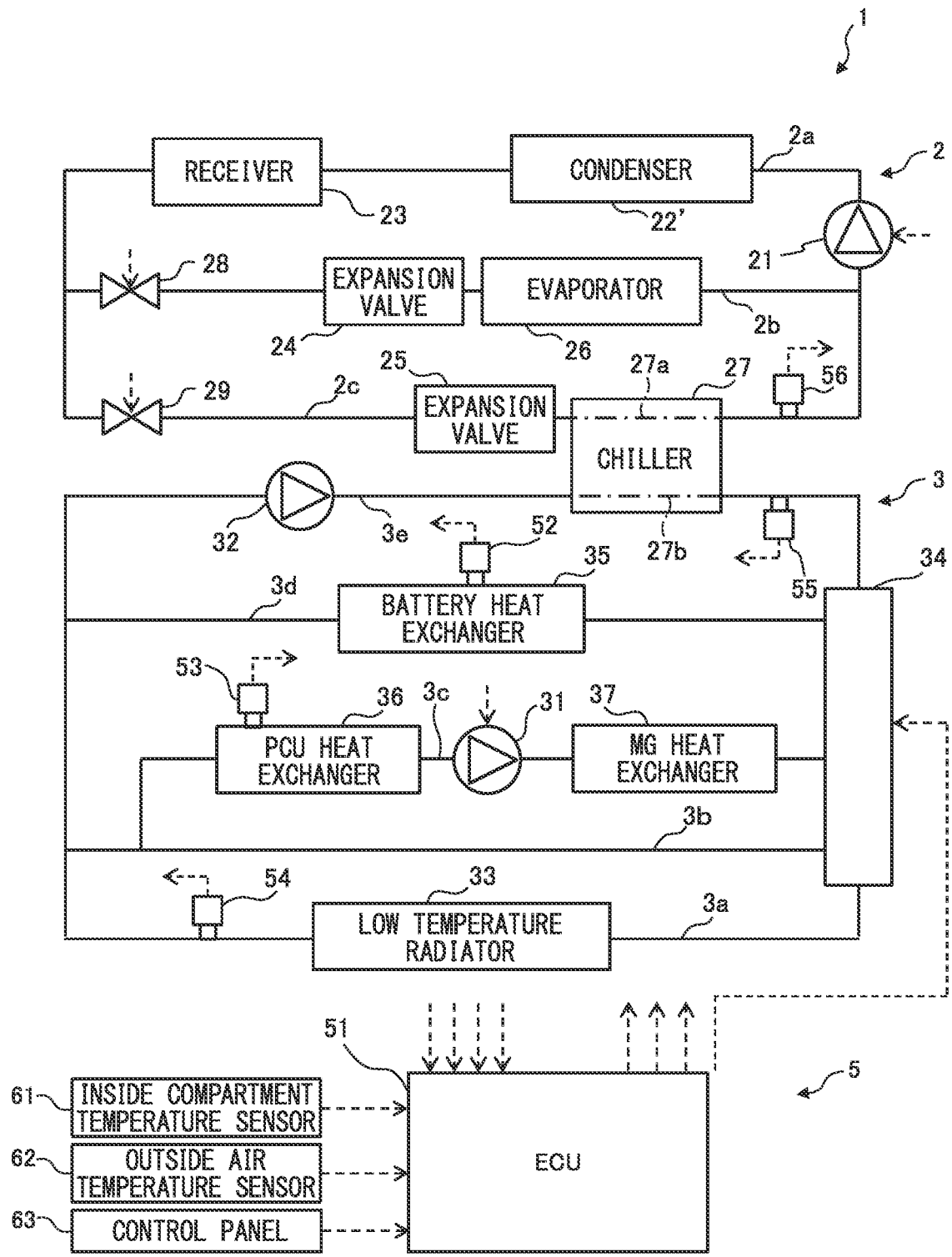
FIG. 13 is a configuration diagram, similar to FIG. 2, schematically illustrating the in-vehicle temperature control system according to a modification.

Further, the in-vehicle temperature control system 1 of the above embodiment includes a high-temperature circuit 4. However, the in-vehicle temperature control system 1 may not include the high-temperature circuit 4 as long as it includes a heat dissipation unit that dissipates heat to the air flowing into the interior of the vehicle 100. Therefore, the in-vehicle temperature control system 1 may include the air-cooled condenser 22' instead of the high-temperature circuit 4 as shown in FIG. 13. In this case, the air passage 6 is provided with the air-cooled condenser 22' instead of the heater core 44. The air-cooled condenser 22' dissipates heat directly to the air flowing into the interior of the vehicle 100 without passing through the cooling water. In this case, the air-cooled condenser 22' functions as a heat dissipation unit that dissipates heat to the air flowing into the interior of the vehicle 100.

In addition, in the above embodiment, the predicted value is calculated based on the output of the sensor that detects the temperature of the cooling water in the low-temperature circuit 3, but the predicted value may be calculated based on other parameters. Specifically, for example, the predicted value may be calculated based on the temperature of the battery 114 detected by the battery temperature sensor 64.

Further, in the above embodiment, the case where the temperature of the cooling water flowing through the chiller 27 is changed by changing the connection state of the five-way valve 34 is described as an example. However, even if the connection state of the five-way valve 34 is not necessarily changed, if the temperature of the chiller 27 is greatly reduced (for example, when the amount of heat generated in the battery 114 is rapidly reduced), the control according to the above embodiment can be performed.

While preferred embodiments of the present invention have been described above, the present invention is not limited to these embodiments, and various modifications and changes can be made within the scope of the claims.

The invention claimed is:

1. An in-vehicle temperature control system mounted on a vehicle, comprising: a low-temperature circuit having a first heat exchanger and in which a first heat medium circulates through the first heat exchanger; a heat dissipation unit for dissipating heat to an air flowing into an interior of the vehicle; a refrigeration circuit in which a refrigerant circulates and for absorbing heat from the first heat medium to the refrigerant at the first heat exchanger and dissipating heat from the refrigerant at the heat dissipation unit; a ratio adjusting device for adjusting a heat dissipation unit passing ratio which is a ratio of a flow rate of air passing through the heat dissipation unit among air flowing into the interior of the vehicle; and a controller configure to control an apparatus capable of adjusting a heat transfer amount which is absorbed to the refrigerant at the first heat exchanger in the refrigeration circuit and is dissipated from the refrigerant at the heat dissipation unit, and the ratio adjusting device, wherein, when the temperature of the first heat medium flowing through the first heat exchanger decreases by a reference value or more, the controller is configured to control the apparatus so that the heat transfer amount is increased and controls the ratio adjusting device so that the heat dissipation unit passing ratio is decreased, before the temperature of the first heat medium flowing through the first heat exchanger decreases by the reference value or more.

2. The in-vehicle temperature control system according to claim 1, wherein, when the temperature of the first heat medium flowing through the first heat exchanger decreases by the reference value or more, the controller is configured to control the apparatus so that the heat transfer amount increases as the predicted value of the amount of decrease in the temperature of the first heat medium increases.

3. The in-vehicle temperature control system according to claim 1, wherein the controller is configured to control the heat dissipation unit passing ratio of the ratio adjusting device so that a temperature of the air flowing into the interior of the vehicle becomes a target temperature, based on a temperature of the heat dissipation unit.

4. The in-vehicle temperature control system according to claim 1, wherein
the low-temperature circuit has a plurality of parallel flow paths through which the first heat medium flows,
the in-vehicle temperature control system further comprises:
a first temperature detector for detecting the temperature of the first heat medium flowing through the first heat exchanger; and
a second temperature detector for detecting the temperature of the first heat medium in a flow path through which the first heat medium does not circulate before the flow path is switched and through which the first medium circulates after the flow path is switched, among the low-temperature circuit, and
the controller is configured to predict whether or not the temperature of the first heat medium flowing through the first heat exchanger changes by the reference value or more by switching the flow path, based on the temperature detected by the first temperature detector and the temperature detected by the second temperature detector.

5. The in-vehicle temperature control system according to claim 1, wherein
the heat dissipation unit is a high-temperature circuit having a heater core for dissipating heat to the air flowing into the interior of the vehicle and a second heat exchanger, and in which a second heat medium circulates through them, and
the second heat exchanger dissipates heat from the refrigerant to the second heat medium.

6. The in-vehicle temperature control system according to claim 1, wherein the heat dissipation unit is an air-cooled condenser that directly dissipates heat from the refrigerant to the air flowing into the interior of the vehicle.

7. The in-vehicle temperature control system according to claim 1, wherein the apparatus includes a compressor provided in the refrigeration circuit and configured to compress the refrigerant.

8. The in-vehicle temperature control system according to claim 1, wherein the apparatus includes an expansion valve provided in the refrigeration circuit and configured to expand the refrigerant.

* * * * *